(12) United States Patent
Zhou

(10) Patent No.: US 12,442,941 B2
(45) Date of Patent: Oct. 14, 2025

(54) RAY DETECTOR SUBSTRATE AND RAY DETECTOR

(71) Applicants: Beijing BOE Sensor Technology Co., Ltd., Beijing (CN); BOE TECHNOLOGY GROUP CO., LTD., Beijing (CN)

(72) Inventor: Lin Zhou, Beijing (CN)

(73) Assignees: BEIJING BOE SENSOR TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 335 days.

(21) Appl. No.: 17/907,771

(22) PCT Filed: Aug. 4, 2021

(86) PCT No.: PCT/CN2021/110630
§ 371 (c)(1),
(2) Date: Aug. 29, 2022

(87) PCT Pub. No.: WO2022/062696
PCT Pub. Date: Mar. 31, 2022

(65) Prior Publication Data
US 2023/0115372 A1    Apr. 13, 2023

(30) Foreign Application Priority Data
Sep. 24, 2020 (CN) .......................... 202011014668.3

(51) Int. Cl.
*G01T 1/20* (2006.01)
*H10F 39/00* (2025.01)
*H10F 39/18* (2025.01)

(52) U.S. Cl.
CPC .......... *G01T 1/2018* (2013.01); *G01T 1/2002* (2013.01); *H10F 39/1898* (2025.01); *H10F 39/8067* (2025.01)

(58) Field of Classification Search
None
See application file for complete search history.

(56) References Cited

U.S. PATENT DOCUMENTS

2007/0158573 A1* 7/2007 Deych ................. G01T 1/20183
                                                            250/370.11
2014/0037045 A1   2/2014 Dafni et al.
2017/0293037 A1  10/2017 Schmidt et al.

FOREIGN PATENT DOCUMENTS

| CN | 102903721 A | 1/2013 |
| CN | 107272045 A | 10/2017 |

(Continued)

OTHER PUBLICATIONS

First Office Action for Chinese Patent Application No. 202011014668.3 issued on by the Chinese Patent Office on Feb. 23, 2023.

*Primary Examiner* — Edwin C Gunberg
(74) *Attorney, Agent, or Firm* — XSENSUS LLP

(57) ABSTRACT

A ray detector substrate includes: photodetectors including first photodetectors and second photodetectors; and dimming portions including, at a side of each first photodetector away from a substrate, a respective first dimming portion, and, at a side of each second photodetector away from the substrate, a respective second dimming portion. A second scintillator layer is configured to convert part of rays into a first radiation fluorescence. A first scintillator layer is configured to convert another part of the rays into a second radiation fluorescence. The first dimming portion is configured to reflect the second radiation fluorescence, and to enable the first radiation fluorescence to pass through the first dimming portion to be detected by the first photode- (Continued)

tector. The second dimming portion is configured to reflect the first radiation fluorescence, and to enable the second radiation fluorescence to pass through the second dimming portion to be detected by the second photodetector.

17 Claims, 9 Drawing Sheets

(56) References Cited

FOREIGN PATENT DOCUMENTS

| | | |
|---|---|---|
| CN | 107799539 A | 3/2018 |
| CN | 207318734 U | 5/2018 |
| CN | 209728185 U | 12/2019 |
| CN | 112117290 A | 12/2020 |
| DE | 19711927 A1 | 9/1998 |
| DE | 102011089595 A1 | 6/2013 |

* cited by examiner

RAY DETECTOR SUBSTRATE AND RAY DETECTOR

CROSS-REFERENCE TO RELATED APPLICATIONS

This application is a national phase entry under 35 USC 371 of International Patent Application No. PCT/CN 2021/110630 filed on Aug. 4, 2021, which claims priority to Chinese Patent Application No. 202011014668.3, filed on Sep. 24, 2020, which are incorporated herein by reference in their entirety.

TECHNICAL FIELD

The present disclosure relates to the field of photoelectric detection technologies, and in particular, to a ray detector substrate and a ray detector.

BACKGROUND

Digital Radiography (DR) becomes a main direction of digital photography technologies due to its significant advantages of fast imaging speed, convenient operation, and high imaging resolution. The technical core of the digital photography is a ray detector (e.g., X-ray detector). The ray detector is a precise and expensive device, which plays a decisive role in imaging quality.

Ray detectors are widely used in the fields of nondestructive testing, medical testing and security inspection.

SUMMARY

In an aspect, a ray detector substrate is provided. The ray detector substrate includes: a substrate; a plurality of photodetectors located on a side of the substrate; a plurality of dimming portions respectively located on sides of the plurality of photodetectors away from the substrate; a first scintillator layer located on a side of the plurality of dimming portions away from the substrate; and a second scintillator layer located on a side of the first scintillator layer away from the substrate. The plurality of photodetectors include a plurality of first photodetectors and a plurality of second photodetectors. The plurality of dimming portions include, at a side of each first photodetector away from the substrate, a respective first dimming portion, and, at a side of each second photodetector away from the substrate, a respective second dimming portion. The second scintillator layer is configured to convert part of rays incident on the second scintillator layer into a first radiation fluorescence, and to enable another part of the rays to pass through the second scintillator layer toward the first scintillator layer. The first scintillator layer is configured to convert the another part of the rays passing through the second scintillator layer into a second radiation fluorescence, and to enable the first radiation fluorescence and the second radiation fluorescence to travel to the plurality of dimming portions. An average energy of the part of the rays is less than an average energy of the another part of the rays, and a wavelength of the first radiation fluorescence is greater than a wavelength of the second radiation fluorescence. The first dimming portion is configured to reflect the second radiation fluorescence, and to enable the first radiation fluorescence to pass through the first dimming portion to be detected by the first photodetector. The second dimming portion is configured to reflect the first radiation fluorescence, and to enable the second radiation fluorescence to pass through the second dimming portion to be detected by the second photodetector.

In some embodiments, each dimming portion includes at least one first dimming layer and at least one second dimming layer. In the at least one first dimming layer and the at least one second dimming layer included in the dimming portion, a film layer closest to the substrate is a first dimming layer in the at least one first dimming layer. A refractive index of the at least one first dimming layer is less than a refractive index of the at least one second dimming layer.

In some embodiments, a thickness of at least one first dimming layer in the first dimming portion is equal to or approximately equal to a thickness of at least one first dimming layer in the second dimming portion. A thickness of at least one second dimming layer in the first dimming portion is less than a thickness of at least one second dimming layer in the second dimming portion.

In some embodiments, the ray detector substrate has a plurality of detection regions. Each detection region is provided with at least two photodetectors arranged in an array therein. The at least two photodetectors include at least one first photodetector and at least one second photodetector.

In some embodiments, a material of the first scintillator layer includes a first perovskite material, and a material of the second scintillator layer includes a second perovskite material.

In some embodiments, halide ions in the first perovskite material are different from halide ions in the second perovskite material, so that a spectrum of the first radiation fluorescence is non-overlapped with a spectrum of the second radiation fluorescence.

In some embodiments, halide ions in the first perovskite material include at least one of chloride ions, bromide ions and iodide ions. Halide ions in the second perovskite material include at least one of chloride ions, bromide ions and iodide ions.

In some embodiments, a forbidden bandwidth of the first scintillator layer is greater than a forbidden bandwidth of the second scintillator layer.

In some embodiments, the rays incident on the second scintillator layer include first energy rays and second energy rays, and an energy of the first energy rays is lower than an energy of the second energy rays. The part of the rays converted by the second scintillator layer include at least part of the first energy rays and part of the second energy rays. The ray detector substrate further includes a filter layer located between the first scintillator layer and the second scintillator layer. The filter layer is configured to block part of the first energy rays unconverted by the second scintillator layer.

In some embodiments, the ray detector substrate further includes a reflective layer located on a side of the second scintillator layer away from the substrate. The reflective layer is configured to enable the rays to pass through the reflective layer toward the second scintillator layer, and to reflect the first radiation fluorescence and/or the second radiation fluorescence incident on the reflective layer.

In some embodiments, the ray detector substrate further includes a light-transmitting plate located on a side of the first scintillator layer proximate to the substrate. The light-transmitting plate is configured to carry the first scintillator layer and the second scintillator layer, and to enable the first radiation fluorescence and the second radiation fluorescence to pass through the light-transmitting plate toward the plurality of dimming portions.

In another aspect, a ray detector is provided. The ray detector includes: the ray detector substrate in any one of the above embodiments; a driving chip electrically connected to the ray detector substrate; and a reading chip electrically connected to the ray detector substrate. The driving chip is configured to supply driving voltages to the plurality of photodetectors. The reading chip is configured to read detection results of the plurality of photodetectors.

In some embodiments, an orthographic projection of an end of each photodetector proximate to a respective dimming portion on the substrate is located within an orthographic projection of the dimming portion on the substrate.

In some embodiments, the at least one first photodetector includes two first photodetectors, and the at least one second photodetector includes two second photodetectors.

In some embodiments, the at least one first photodetector includes three first photodetectors, and the at least one second photodetector includes a second photodetector.

In some embodiments, the at least one first photodetector includes a first photodetector, and the at least one second photodetector includes three second photodetectors.

In some embodiments, a thickness of the first scintillator layer is in a range of 1 μm to 2000 μm, inclusive.

In some embodiments, a thickness of the second scintillator layer is in a range of 1 μm to 2000 μm, inclusive.

In some embodiments, a thickness of the filter layer is in a range of 5 μm to 1000 μm, inclusive.

In some embodiments, a thickness of the light-transmitting plate is in a range of 50 μm to 10000 μm, inclusive.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product involved in the embodiments of the present disclosure.

DETAILED DESCRIPTION

Figure 1:
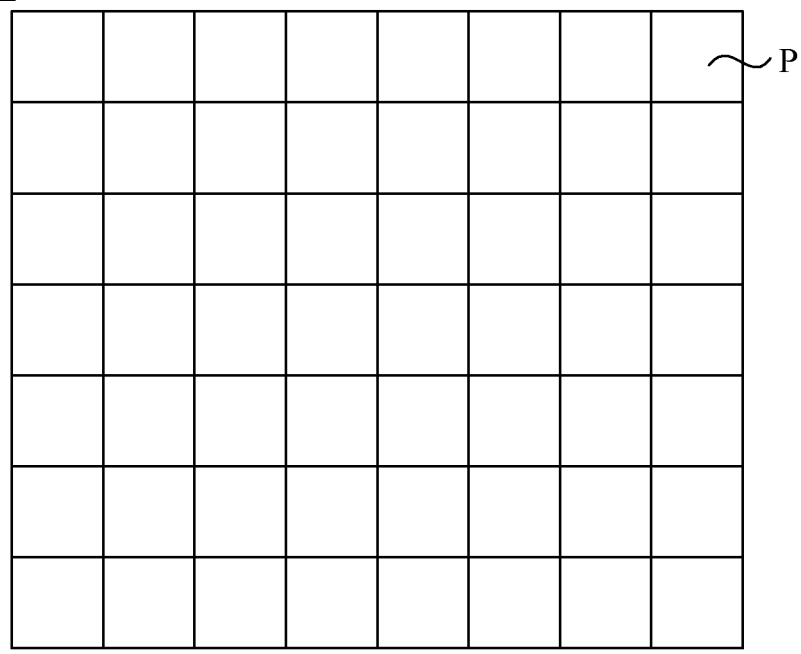
FIG. 1 is a structural diagram of a ray detector substrate, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "an example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the term "connected" and derivatives thereof may be used. For example, the term "connected" may be used in the description of some embodiments to indicate that two or more components are in direct physical or electrical contact with each other. The embodiments disclosed herein are not necessarily limited to the contents herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of the phase "applicable to" or "configured to" herein means an open and inclusive expression, which does not exclude devices that are applicable to or configured to perform additional tasks or steps.

In addition, the use of the phase "based on" means openness and inclusiveness, since a process, step, calculation or other action that is "based on" one or more stated conditions or values may, in practice, be based on additional conditions or values exceeding those stated.

As used herein, the term such as "about" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Below, a description will be made in an example where the ray detector in the background is an X-ray detector.

In an implementation, in the medical testing, applied X-rays generally have an energy of between 20 KeV and 120 KeV. Since different tissues of a human body absorb different amounts of X-rays, and X-rays passing through the human body have different radiation intensities, the X-ray detector is used to detect the X-rays passing through the human body to obtain images of the internal tissues of the human body, so that medical diagnosis may be performed. However, by using this method, the images of the internal tissues of the human body are superposed together, and only limited information is obtained. If it is possible to determine whether the X-rays passing through the human body are X-rays with high energy or X-rays with low energy, information from previous two detections may be obtained in a detection, so that a patient bears less radiation dose.

In the related art, in a detection of dual-energy X-rays, two detectors (i.e., a low-energy X-ray detector and a high-energy X-ray detector) that are stacked are commonly used, and the low-energy X-ray detector is closer to the human body than the high-energy X-ray detector.

However, in a process of detecting the dual-energy X-rays by using the two detectors, high-energy X-rays need to pass through the low-energy X-ray detector, and then are detected by the high-energy X-ray detector, which easily results in a reduction in stability and service life of the low-energy X-ray detector. Moreover, the low-energy X-ray detector and the high-energy X-ray detector are two independent structures. In a process of assembling the low-energy X-ray detector and the high-energy X-ray detector, the capability of detecting the dual-energy X-rays is easily influenced by a relative position or an assembly accuracy of the low-energy X-ray detector and the high-energy X-ray detector.

Based on this, some embodiments of the present disclosure provide a ray detector substrate. The ray detector substrate is capable of detecting a plurality of types of rays. The structure and operating principle of the ray detector substrate will be schematically described below by taking a type of rays (i.e., X-rays) in the plurality of types of rays as an example.

In some embodiments, as shown in FIGS. 5 to 10, the ray detector substrate 100 includes a substrate 1.

A type of the substrate 1 varies, and may be set according to actual needs.

For example, the substrate 1 may be a blank base substrate. For another example, the substrate 1 may include the blank base substrate and functional film(s) (e.g., a buffer layer) disposed on a side of the blank base substrate.

A type of the blank base substrate varies. For example, the blank base substrate may be a polymethyl methacrylate (PMMA) base substrate or a glass base substrate.

Figure 11:
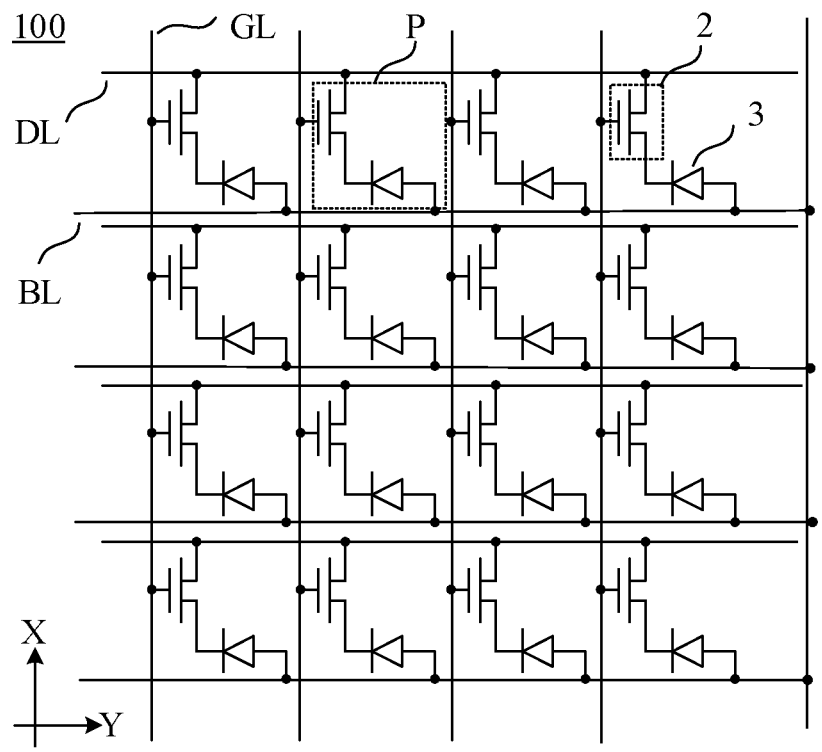
FIG. 11 is an equivalent circuit diagram of a ray detector substrate, in accordance with some embodiments of the present disclosure.

In some embodiments, as shown in FIG. 11, the ray detector substrate 100 further includes a plurality of gate lines GL and a plurality of data lines DL that are all disposed on a side of the substrate 1. The plurality of gate lines GL extend in a first direction X, and the plurality of data lines DL extend in a second direction Y. For example, the plurality of data lines DL are located on a side of the plurality of gate lines GL away from the substrate 1, and the plurality of data lines DL are insulated from the plurality of gate lines GL.

In some examples, the first direction X and the second direction Y intersect, which means that the plurality of gate lines GL and the plurality of data lines DL cross, so that a plurality of regions P (as shown in FIG. 1) may be defined by using the plurality of gate lines GL and the plurality of data lines DL.

Here, an included angle between the first direction X and the second direction Y may be set according to actual needs. For example, the included angle between the first direction X and the second direction Y is 90°. That is, the plurality of gate lines GL are perpendicular to or approximately perpendicular to the plurality of data lines DL.

In some examples, as shown in FIG. 11, the ray detector substrate 100 further includes, disposed on the side of the substrate 1 and located in each region P, a respective transistor 2.

Figure 9:
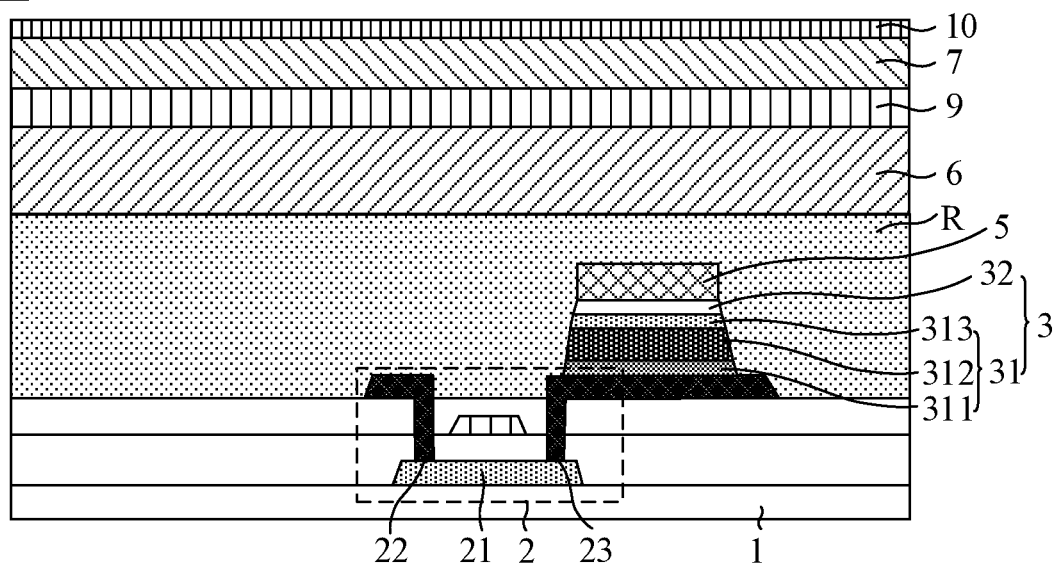
FIG. 9 is a structural diagram of yet another ray detector substrate, in accordance with some embodiments of the present disclosure.
Figure 10:
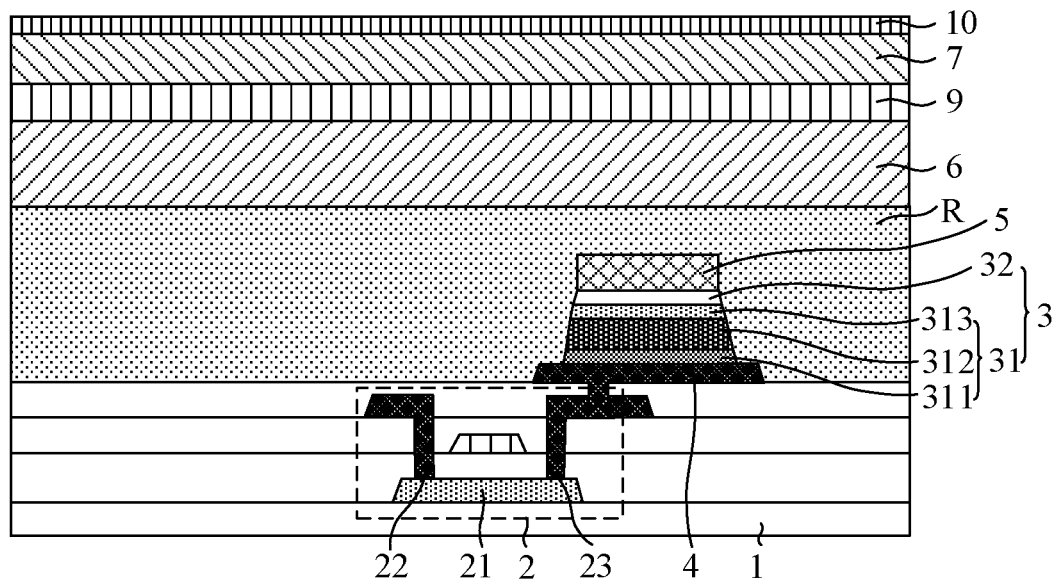
FIG. 10 is a structural diagram of yet another ray detector substrate, in accordance with some embodiments of the present disclosure.

For example, as shown in FIGS. 9 and 10, the transistor 2 is a thin film transistor including a gate 21, a source 22 and a drain 23. The gate 21 and the plurality of gate lines GL may be arranged in a same layer. The source 22, the drain 23, and the plurality of data lines DL may be arranged in a same layer.

A type of the thin film transistor varies, and may be set according to actual needs. For example, the thin film transistor may be an amorphous silicon thin film transistor, an oxide thin film transistor, or a low-temperature polysilicon thin film transistor.

It will be noted that the term "same layer" herein means that a film layer for forming a specific pattern is formed by a same film forming process, and then is patterned by one patterning process using a same mask to form a layer structure. Depending on different specific patterns, the one patterning process may include several exposure, development, or etching processes, and the specific patterns in the formed layer structure may be continuous or discontinuous, and these specific patterns may also be at different heights or have different thicknesses. In this way, a gate 21 of each transistor 2 and the plurality of gate lines GL may be manufactured synchronously in the one patterning process, and a source 22 and a drain 23 of each transistor 2 and the plurality of data lines DL may be manufactured synchronously in the one patterning process, which is conducive to simplifying a manufacturing process of the ray detector substrate 100.

In some examples, as shown in FIG. 11, regions P arranged in a line in the first direction X may be referred to as a same column of regions P, and regions P arranged in a line in the second direction Y may be referred to as a same row of regions P. Transistors 2 in a same column of regions P may be electrically connected to a same gate line GL, and transistors 2 in a same row of regions P may be electrically connected to a same data line DL. Each transistor 2 may be electrically connected to a corresponding gate line GL through the gate 21, and be electrically connected to a corresponding data line DL through one of the source 22 and the drain 23 (e.g., the source 22).

Of course, transistors 2 in a same column of regions P may be electrically connected to a plurality of gate lines GL, which is not limited in the embodiments of the present disclosure.

In some embodiments, as shown in FIGS. 5 to 10, the ray detector substrate 100 further includes a plurality of photodetectors 3 located on the side of the substrate 1. The plurality of photodetectors 3 may be respectively located in the plurality of regions P. That is, each region P is provided with a photodetector 3 therein.

A structure of the photodetector 3 varies. For example, as shown in FIGS. 9 and 10, the photodetector 3 includes a semiconductor layer 31 and a protective electrode 32 disposed on a side of the semiconductor layer 31 away from the substrate 1. The protective electrode 32 may, for example, cover the semiconductor layer 31.

As shown in FIGS. 9 and 10, the semiconductor layer 31 may include, for example, an N-type semiconductor layer 311 (made of, for example, N-type amorphous silicon), an intrinsic semiconductor layer 312 (made of, for example, amorphous silicon) and a P-type semiconductor layer 313 (made of, for example, P-type amorphous silicon) that are stacked in sequence. Here, the N-type amorphous silicon may be amorphous silicon doped with phosphorus ions, and the P-type amorphous silicon may be amorphous silicon doped with boron ions.

In some examples, the semiconductor layer 31 is able to collect light incident on itself and perform photoelectric conversion. The protective electrode 32 is able to protect the side of the semiconductor layer 31 away from the substrate 1, so as to prevent the side of the semiconductor layer 31 away from the substrate 1 from being damaged, thereby preventing performances of the semiconductor layer 31 from being adversely affected.

In some examples, the protective electrode 32 is made of a light-transmitting conductive material. For example, the protective electrode 32 may be made of indium tin oxide (ITO) or indium doped zinc oxide (IZO). In this way, the light collection of the semiconductor layer 31 may be prevented from being influenced by the shielding of light by the protective electrode 32.

In some examples, a transistor 2 and a photodetector 3 in a same region P are electrically connected to each other. In this way, an electrical signal converted by the photodetector 3 may be controlled to be derived by using the transistor 2.

Here, an electrical connection between the transistor 2 and the photodetector 3 varies, and may be set according to actual needs.

For example, as shown in FIG. 9, the photodetector 3 is located on a surface of the source 22 and the drain 23 of the transistor 2 away from the substrate 1, and the semiconductor layer 31 of the photodetector 3 is directly electrically connected to one of the source 22 and the drain 23 that is not electrically connected to the data line DL.

For example, in a case where the transistor 2 is electrically connected to the data line DL through the source 22, the photodetector 3 may be in direct contact with the drain 23 of the transistor 2 to form the electrical connection. In a case where the transistor 2 is electrically connected to the data line DL through the drain 23, the photodetector 3 may be in direct contact with the source 22 of the transistor 2 to form the electrical connection.

This is conducive to simplifying a process of manufacturing the ray detector substrate 100 and improving a production efficiency of the ray detector substrate 100.

For example, as shown in FIG. 10, the ray detector substrate 100 further includes connection portions 4, and each transistor 2 and the photodetector 3 are provided with a connection portion therebetween. The semiconductor layer 31 of the photodetector 3 is electrically connected to one of the source 22 and the drain 23 of the transistor 2 that is not electrically connected to the data line DL through the connection portion 4.

This is conducive to reducing an area occupied by the transistor 2 and the photodetector 3 in a direction parallel to the substrate 1 to improve a space utilization rate, so that more regions P may be divided in a limited area of the substrate 1, and more transistors 2 and photodetectors 3 may be disposed, thereby improving a resolution of the ray detector substrate 100.

Here, the connection portion 4 may, for example, be manufactured by the same material as the source 22 and the drain 23 of the transistor 2.

In some embodiments, as shown in FIG. 11, the ray detector substrate 100 further includes a plurality of bias voltage signal lines disposed on a side of the plurality of photodetectors 3 away from the substrate 1 and extending in the second direction Y. Photodetectors 3 in each row may be electrically connected to a bias voltage signal line BL.

In some examples, the transistor 2 may input a first electrical signal to the photodetector 3 electrically connected thereto, and the bias voltage signal line BL electrically connected to the photodetector 3 may input a second electrical signal to the photodetector 3, so that the photodetector 3 may operate under a cooperation of the first electrical signal and the second electrical signal to perform photoelectric conversion. For example, one of the first electrical signal and the second electrical signal is a positive bias voltage signal, and another one of the first electrical signal and the second electrical signal is a negative bias voltage signal.

In some embodiments, as shown in FIGS. 5 to 10, the ray detector substrate 100 further includes a plurality of dimming portions 5 respectively disposed on sides of the plurality of photodetectors 3 away from the substrate 1. For example, the plurality of dimming portions 5 are respectively located in the plurality of regions P, and a side of each photodetector 3 away from the substrate 1 is provided with a dimming portion 5.

In some examples, as shown in FIGS. 5 to 8, the plurality of dimming portions 5 include a plurality of first dimming portions 5a and a plurality of second dimming portions 5b. A side of each first dimming portion 5a proximate to the substrate 1 is provided with a photodetector 3, and this photodetector 3 may be referred to as a first photodetector 3a. A side of each second dimming portion 5b proximate to the substrate 1 is provided with a photodetector 3, and this photodetector 3 may be referred to as a second photodetector 3b.

In some embodiments, as shown in FIGS. 5 to 10, the ray detector substrate 100 further includes a first scintillator layer 6 disposed on a side of the plurality of dimming portions 5 away from the substrate 1, and a second scintillator layer 7 disposed on a side of the first scintillator layer 6 away from the substrate 1.

In some examples, orthographic projections of the plurality of dimming portions 5 on the substrate 1 are located within an orthographic projection of the first scintillator layer 6 on the substrate 1. That is, the first scintillator layer 6 covers the plurality of dimming portions 5. The orthographic projection of the first scintillator layer 6 on the substrate 1 is located within an orthographic projection of the second scintillator layer 7 on the substrate 1. Alternatively, the orthographic projection of the first scintillator layer 6 on the substrate 1 coincides with the orthographic projection of the second scintillator layer 7 on the substrate 1. That is, the second scintillator layer 7 covers the first scintillator layer 6.

Based on this, in some examples, as shown in FIGS. 5 to 10, the first scintillator layer 6 and the second scintillator layer 7 are each of a flat structure.

In some embodiments, an arrangement of the first scintillator layer 6 and the dimming portions 5 varies, and may be set according to actual needs.

In some examples, as shown in FIGS. 5 to 10, the ray detector substrate 100 further includes a resin layer R disposed on the side of the plurality of dimming portions 5 away from the substrate 1. The resin layer R covers and protects the plurality of dimming portions 5, so as to avoid damage to the dimming portions 5 in a subsequent manufacturing process.

Figure 5:
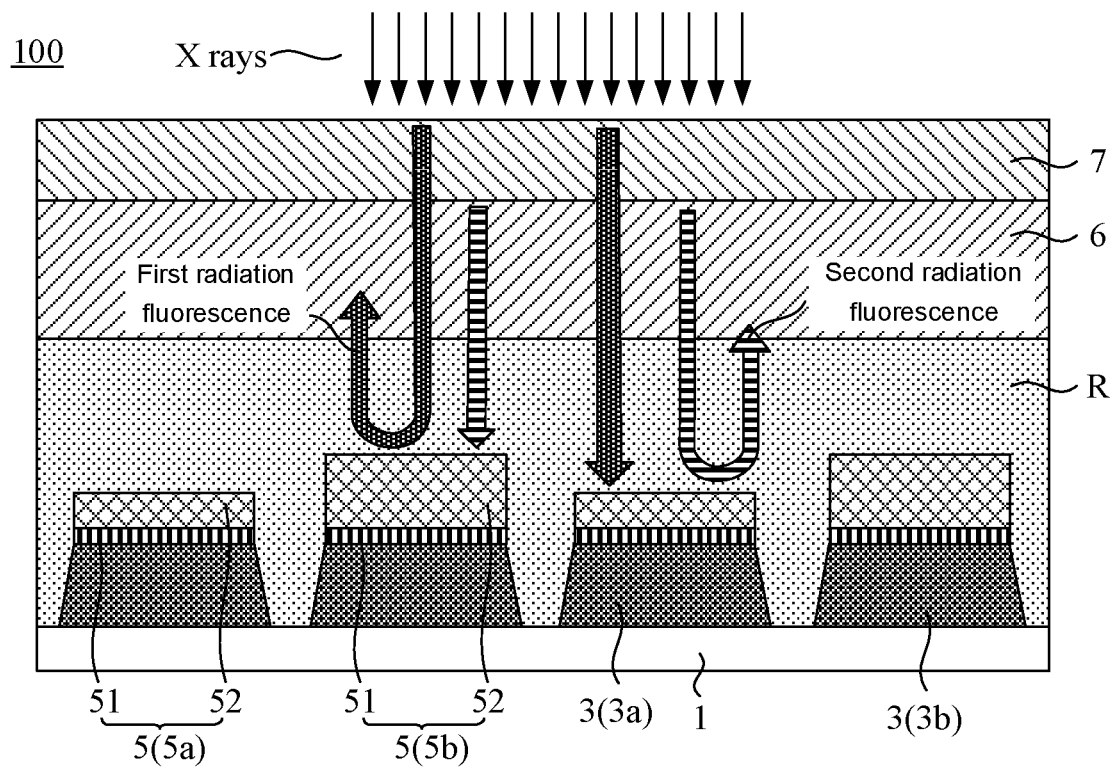
FIG. 5 is a structural diagram of yet another ray detector substrate, in accordance with some embodiments of the present disclosure.

For example, as shown in FIG. 5, the first scintillator layer 6 may be located on a side of the resin layer R away from the substrate 1, which means that in the process of manufacturing the ray detector substrate 100, after the resin layer R is manufactured, the first scintillator layer 6 may be directly manufactured. This is conducive to simplifying the manufacturing process of the ray detector substrate 100.

Figure 6:
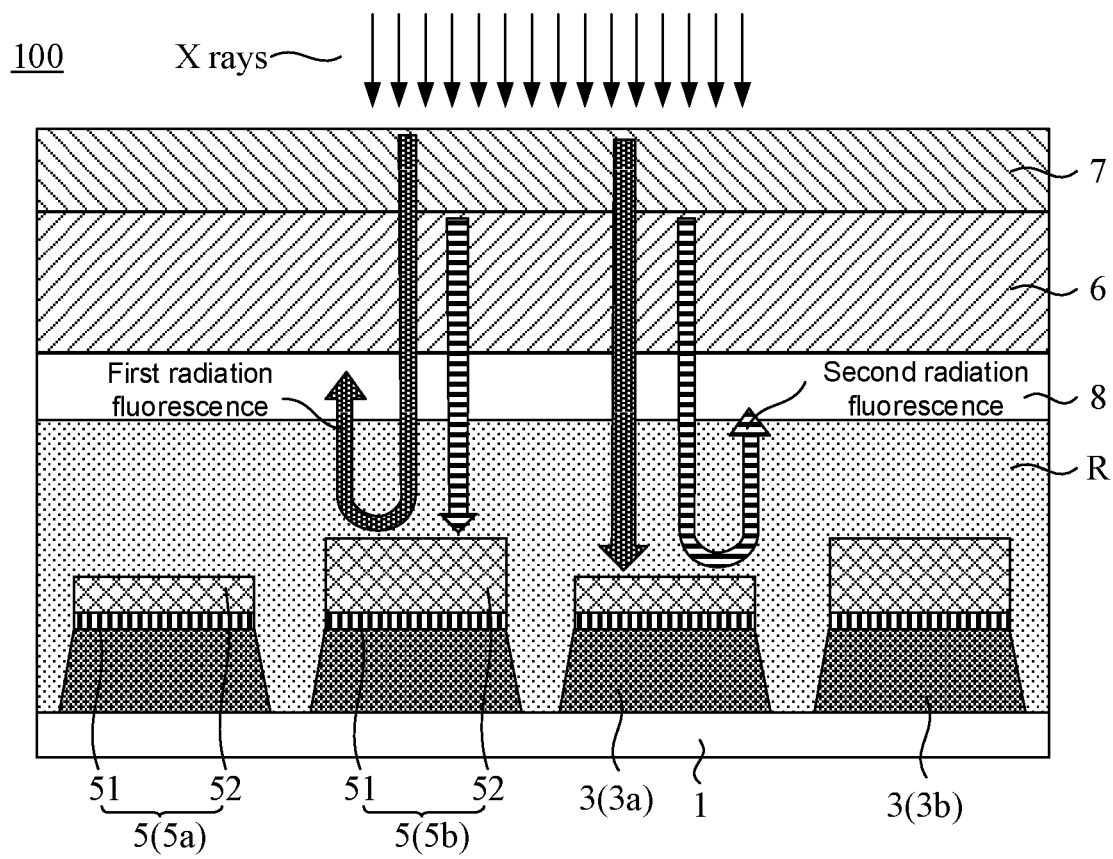
FIG. 6 is a structural diagram of yet another ray detector substrate, in accordance with some embodiments of the present disclosure.
Figure 7:
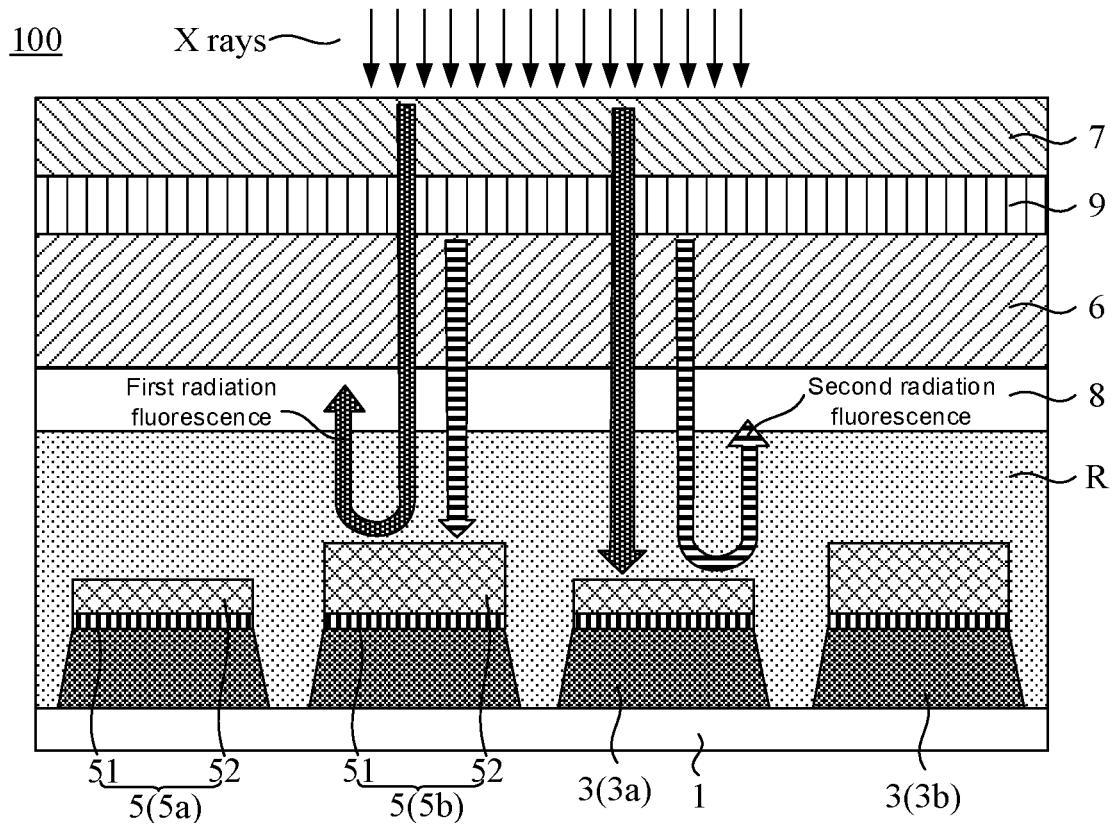
FIG. 7 is a structural diagram of yet another ray detector substrate, in accordance with some embodiments of the present disclosure.
Figure 8:
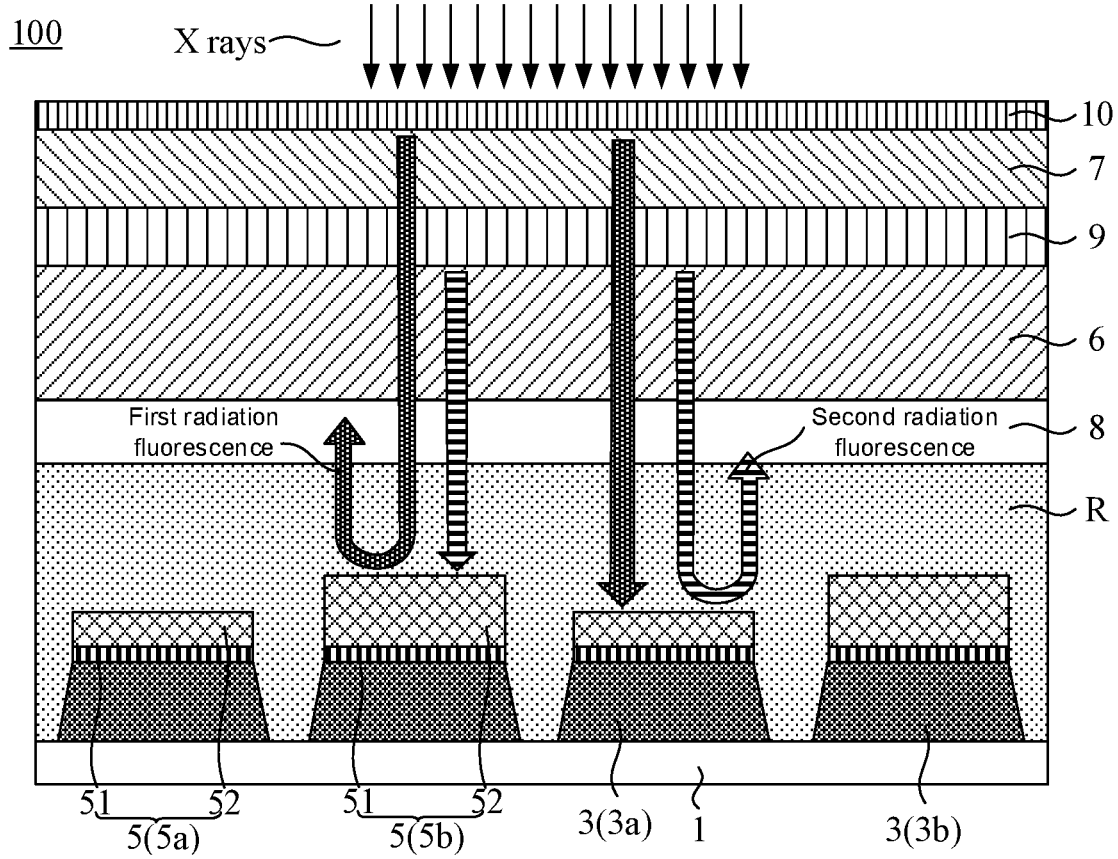
FIG. 8 is a structural diagram of yet another ray detector substrate, in accordance with some embodiments of the present disclosure.

For example, as shown in FIGS. 6 to 8, the ray detector substrate 100 further includes a light-transmitting plate 8 located on a side of the first scintillator layer 6 proximate to the substrate 1. The light-transmitting plate 8 is configured to carry the first scintillator layer 6 and the second scintillator layer 7, and to enable a first radiation fluorescence and a second radiation fluorescence to pass through the light-transmitting plate 8 toward the plurality of dimming portions 5.

In this case, in the process of manufacturing the ray detector substrate 100, the first scintillator layer 6 and the second scintillator layer 7 may be sequentially manufactured on a side of the light-transmitting plate 8, and then the light-transmitting plate 8, the first scintillator layer 6 and the second scintillator layer 7 are disposed on the side of the resin layer R away from the substrate 1.

Here, since the first scintillator layer 6 and the second scintillator layer 7 are each of an integrative structure (i.e., the first scintillator layer 6 and the second scintillator layer 7 each include a pattern, instead of being constituted by a plurality of patterns), and cover the plurality of dimming portions 5. In this way, an alignment accuracy of the light-transmitting plate 8 and the resin layer R may be reduced. After the light-transmitting plate 8 is combined with the resin layer R, the first scintillator layer 6 and the second scintillator layer 7 are ensured to cover the plurality of dimming portions 5.

The light-transmitting plate 8 has a high light transmittance, so as to ensure that the first radiation fluorescence and the second radiation fluorescence are able to pass through the light-transmitting plate. For example, the light-transmitting plate 8 has a transmittance of more than 70% for light with a wavelength of 350 nm to 800 nm.

A structure of the light-transmitting plate 8 varies. For example, the light-transmitting plate 8 may be a fiber optic plate or an optical lens.

The thickness of the light-transmitting plate 8 may be, for example, in a range of 50 μm to 10000 μm, inclusive. In this way, the effect of carrying the first scintillator layer 6 and the second scintillator layer 7 by the light-transmitting plate 8 may be ensured, and the light-transmitting plate 8 is ensured to have a high light transmittance. For example, the thickness of the light-transmitting plate 8 may be 50 μm, 500 μm, 1000 μm, 5000 μm, or 10000 μm.

In some embodiments, the second scintillator layer 7 is configured to convert part of X-rays incident on the second scintillator layer 7 into the first radiation fluorescence, and to enable another part of the X-rays to pass through the second scintillator layer 7 toward the first scintillator layer 6. The first scintillator layer 6 is configured to convert the another part of the X-rays passing through the second scintillator layer 7 into the second radiation fluorescence, and to enable the first radiation fluorescence and the second radiation fluorescence to travel to the plurality of dimming portions 5. An average energy of the part of X-rays converted by the second scintillator layer 7 is less than an average energy of the another part of the X-rays unconverted by the second scintillator layer 7, and a wavelength of the first radiation fluorescence is greater than a wavelength of the second radiation fluorescence.

The first dimming portion 5a is configured to reflect the second radiation fluorescence, and to enable the first radiation fluorescence to pass through the first dimming portion 5a to be detected by the first photodetector 3a. The second dimming portion 5b is configured to reflect the first radiation fluorescence, and to enable the second radiation fluorescence to pass through the second dimming portion 5b to be detected by the second photodetector 3b.

Below, the operating principle of the ray detector substrate 100 will be schematically described by taking the structure shown in FIG. 5 as an example.

First, the X-rays are incident on the second scintillator layer 7.

For example, the X-rays include first energy X-rays and second energy X-rays, and an energy of the first energy X-rays is lower than an energy of the second energy X-rays. For example, the first energy X-rays may be referred to as low-energy X-rays, and the second energy X-rays may be referred to as high-energy X-rays. The terms "low" and "high" are merely means that the energy of the first energy X-rays and the energy of the second energy X-rays are relative.

Then, after being irradiated by the X-rays, the second scintillator layer 7 converts the part of the X-rays into the first radiation fluorescence.

For example, the part of the X-rays converted by the second scintillator layer 7 include at least part of the low-energy X-rays and part of the high-energy X-rays. That is, the second scintillator layer 7 mainly converts the low-energy X-rays, and also converts a small part of the high-energy X-rays.

Since the high-energy X-rays have a deeper penetration depth than the low-energy X-rays, after the low-energy X-rays are completely or almost completely absorbed and converted by the second scintillator layer 7, most of the high-energy X-rays continue to propagate toward the first scintillator layer 6.

Then, after being irradiated by most of the high-energy X-rays, the first scintillator layer 6 converts the most of the high-energy X-rays into the second radiation fluorescence.

For example, the first radiation fluorescence is able to pass through the first scintillator layer 6 toward the dimming portions 5. The second radiation fluorescence is also able to travel to the dimming portions 5. The first radiation fluorescence and the second radiation fluorescence are in a mixed state during travelling to the dimming portions 5. In a case where a ratio of the high-energy X-rays to the low-energy X-rays is different, a ratio of the first radiation fluorescence to the second radiation fluorescence is also different. In this case, light incident on each first dimming portion 5a includes the first radiation fluorescence and the second radiation fluorescence; and light incident on each second dimming portion 5b includes the first radiation fluorescence and the second radiation fluorescence.

Then, in the light incident on a surface of the first dimming portion 5a away from the substrate 1, the first dimming portion 5a reflects the second radiation fluorescence, and to enable the first radiation fluorescence to pass through the first dimming portion 5a to be detected by the first photodetector 3a. In the light incident on a surface of the second dimming portion 5b away from the substrate 1, the second dimming portion 5b reflects the first radiation fluorescence, and to enable the second radiation fluorescence to pass through the second dimming portion 5b to be detected by the second photodetector 3b.

That is, the first dimming portion 5a is able to reflect a radiation fluorescence with a short wavelength and transmit a radiation fluorescence with a long wavelength. The radiation fluorescence with the long wavelength is collected by the first photodetector 3a, and is subjected to photoelectric conversion. The second dimming portion 5b is able to reflect the radiation fluorescence with the long wavelength and transmit the radiation fluorescence with the short wavelength. The radiation fluorescence with the short wavelength is collected by the second photodetector 3b, and is subjected to photoelectric conversion. In this way, the X-rays (i.e., dual-energy X-rays) may be detected.

Thus, in the ray detector substrate 100 provided in some embodiments of the present disclosure, the side of each photodetector 3 away from the substrate 1 is provided with the dimming portion 5, and the first scintillator layer 6 and the second scintillator layer 7 are sequentially disposed on the side of the plurality of dimming portions 5 away from the substrate 1, so that the first scintillator layer 6 and the second scintillator layer 7 may be used to obtain the radiation fluorescences with different wavelengths by conversion, and the first dimming portion 5a and the second dimming portion 5b in the dimming portions 5 may be used to respectively transmit the radiation fluorescences in different wavelength ranges and reflect the radiation fluorescences in other wavelength ranges. Thus, the photodetectors 3 may be used to detect the radiation fluorescences with different wavelengths, so that the detection of the dual-energy X-rays is realized.

Moreover, the ray detector substrate 100 is of an integrative structure, instead of being assembled by two or more structures that are completely independent, which may reduce an influence on the capability of detecting the dual-energy X-rays due to relative position(s) or assembly accuracy(s) of the two or more structures, so that the ray detector substrate 100 has a good capability of detecting the dual-energy X-rays.

In addition, the overall structure of the ray detector substrate 100 is improved, and the structure is simple and easy to manufacture. Compared with the related art, the high-energy X-rays may be prevented from passing through the low-energy X-ray detector, so that the reduction in stability and service life of the low-energy X-ray detector in the related art is avoided.

Here, it will be noted that the second scintillator layer 7 also converts a small part of the high-energy X-rays during the conversion of the low-energy X-rays, which means that the first radiation fluorescence includes a radiation fluorescence converted by the low-energy X-rays and a radiation fluorescence converted by the small part of the high-energy X-rays. The first scintillator layer 6 converts another part of the high-energy X-rays. That is, the second radiation fluorescence includes a radiation fluorescence converted by the another part of the high-energy X-rays.

Based on this, for example, in a process of calculating the radiation fluorescence converted by the low-energy X-rays and the radiation fluorescence converted by the small part of the high-energy X-rays in the first radiation fluorescence, the second radiation fluorescence may be combined, and a proper coefficient is selected for the second radiation fluorescence, and a subtraction operation is carried out on the second radiation fluorescence and the first radiation fluorescence to obtain the radiation fluorescence converted by the small part of the high-energy X-rays in the first radiation fluorescence, so as to obtain the radiation fluorescence converted by the low-energy X-rays and the radiation fluorescence converted by all the high-energy X-rays. Of course, the calculation method is not limited thereto.

In some embodiments, as shown in FIGS. 5 to 8, an orthographic projection of an end of each photodetector 3 proximate to the dimming portion 5 on the substrate 1 is located within an orthographic projection of the dimming portion 5 on the substrate 1.

In this way, the dimming portion 5 may cover the end of the photodetector 3 proximate to the dimming portion 5, so that a radiation fluorescence collected by each photodetector 3 is ensured to be a radiation fluorescence transmitted by a corresponding dimming portion 5, so as to improve an accuracy of the detection results of the ray detector substrate 100.

In some embodiments, as shown in FIGS. 5 to 8, each dimming portion 5 includes at least one first dimming layer 51 and at least one second dimming layer 52. In all first dimming layer(s) 51 and all second dimming layer(s) 52 included in the dimming portion 5, a film layer closest to the substrate 1 is a first dimming layer 51.

For example, as shown in FIGS. 5 to 8, each dimming portion 5 includes a first dimming layer 51 and a second dimming layer 52. The first dimming layer 51 is closer to the substrate 1 than the second dimming layer 52.

For example, each dimming portion 5 includes two first dimming layers 51 and a second dimming layer 52. An arrangement order of the two first dimming layers 51 and the second dimming layer 52 may be, for example, a first dimming layer 51, another first dimming layer 51 and the second dimming layer 52, or the first dimming layer 51, the second dimming layer 52 and the another first dimming layer 51. The first dimming layer 51 is closer to the substrate 1 than the second dimming layer 52.

In some examples, a refractive index of the first dimming layer 51 is less than a refractive index of the second dimming layer 52. In this way, light with some wavelengths may be selectively transmitted and selectively reflected by cooperation of the first dimming layer(s) 51 and the second dimming layer(s) 52.

For example, the refractive index of the first dimming layer 51 is in a range of 1 to 3, inclusive, and the refractive index of the second dimming layer 52 is in a range of 1.5 to 5, inclusive.

For example, the refractive index of the first dimming layer 51 may be 1, 1.3, 1.9, 2.5, 2.6, or 3. The refractive index of the second dimming layer 52 may be 1.5, 2, 2.7, 3.3, 4, or 5.

It will be noted that although the range of the refractive index of the first dimming layer 51 is partially overlapped with the range of the refractive index of the second dimming layer 52, the value of the refractive index of the first dimming layer 51 is ensured to be less than the value of the refractive index of the second dimming layer 52. For example, in a case where the refractive index of the first dimming layer 51 is 2.5, the refractive index of the second dimming layer 52 may be any value greater than 2.5 and less than or equal to 5.

A material of the first dimming layer 51 and a material of the second dimming layer 52 vary, and may be set according to actual needs.

In some examples, the material of the first dimming layer 51 includes at least one of silicon nitride, ITO, silicon oxide, titanium dioxide, hafnium dioxide and resin. The material of the second dimming layer 52 includes at least one of amorphous silicon, amorphous germanium, amorphous germanium-silicon alloy and gallium antimonide.

Here, in a case where the dimming portion 5 includes a plurality of first dimming layers 51, the plurality of first dimming layers 51 may be made of the same or different materials. For example, the plurality of first dimming layers 51 may be made of silicon nitride. Alternatively, in the plurality of first dimming layers 51, a first dimming layer 51 may be made of silicon nitride, and other first dimming layers 51 may be made of resin. Of course, in a case where the dimming portion 5 includes a plurality of second dimming layers 52, the plurality of second dimming layers 52 may be made of the same or different materials.

In some examples, the thickness of the first dimming layer 51 is in a range of 10 nm to 2000 nm, inclusive. The thickness of the second dimming layer 52 is in a range of 10 nm to 200 nm, inclusive.

For example, the thickness of the first dimming layer 51 may be 10 nm, 20 nm, 100 nm, 500 nm, 1000 nm, 1800 nm, or 2000 nm. The thickness of the second dimming layer 52 may be 10 nm, 30 nm, 80 nm, 120 nm, 150 nm, 180 nm, or 200 nm.

In some examples, as shown in FIGS. 5 to 8, the thickness of the first dimming layer 51 in the first dimming portion 5a is equal to or approximately equal to the thickness of the first dimming layer 51 in the second dimming portion 5b. The thickness of the second dimming layer 52 in the first dimming portion 5a is less than the thickness of the second dimming layer 52 in the second dimming portion 5b.

As shown in FIGS. 5 to 8, the first dimming portion 5a and the second dimming portion 5b will be schematically described below in an example where the dimming portion 5 includes a first dimming layer 51 and a second dimming layer 52. The first dimming layer 51 may be made of, for example, silicon nitride with a refractive index of 2, and the second dimming layer 52 may be made of, for example, amorphous silicon with a refractive index of 4. The thickness of the first dimming layer 51 in the first dimming portion 5a and the thickness of the first dimming layer 51 in the second dimming portion 5b may be, for example, 50 nm. The thickness of the second dimming layer 52 in the first dimming portion 5a may be 80 nm, and the thickness of the second dimming layer 52 in the second dimming portion 5b may be 120 nm.

Figure 12:
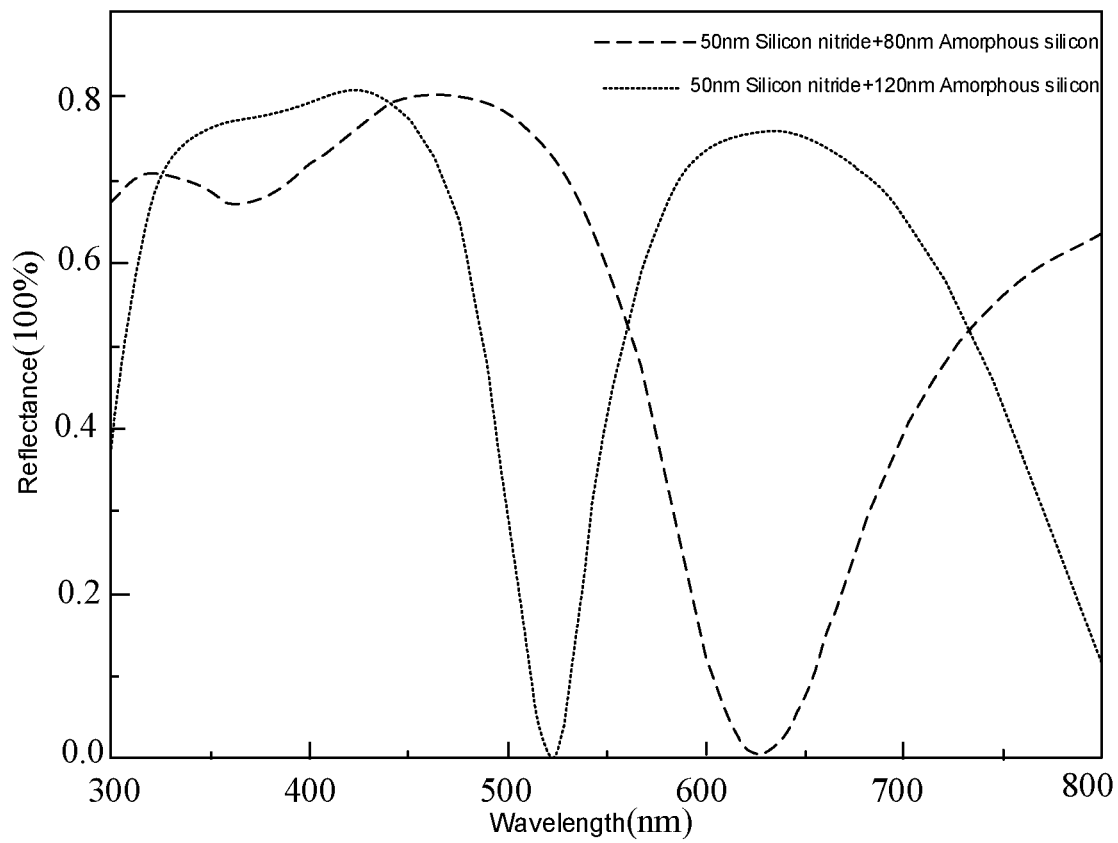
FIG. 12 is a graph showing a reflectance of a first dimming portion and a reflectance of a second dimming portion, in accordance with some embodiments of the present disclosure.

As shown in FIG. 12, FIG. 12 is a graph showing a reflectance of the first dimming portion 5a and a reflectance of the second dimming portion 5b. It can be seen from FIG. 12 that the larger the value of the reflectance is, the greater the amount of light, incident on the first dimming portion 5a or the second dimming portion 5b, reflected by the first dimming portion 5a or the second dimming portion 5b. The first dimming portion 5a has a reflectance of approximately 0 for light with a wavelength of about 620 nm, i.e., has a high transmittance for the light with the wavelength of about 620 nm. The second dimming portion 5b has a reflectance of approximately 0 for light with a wavelength of about 520 nm, i.e., has a high transmittance for the light with the wavelength of about 520 nm.

Figure 13:
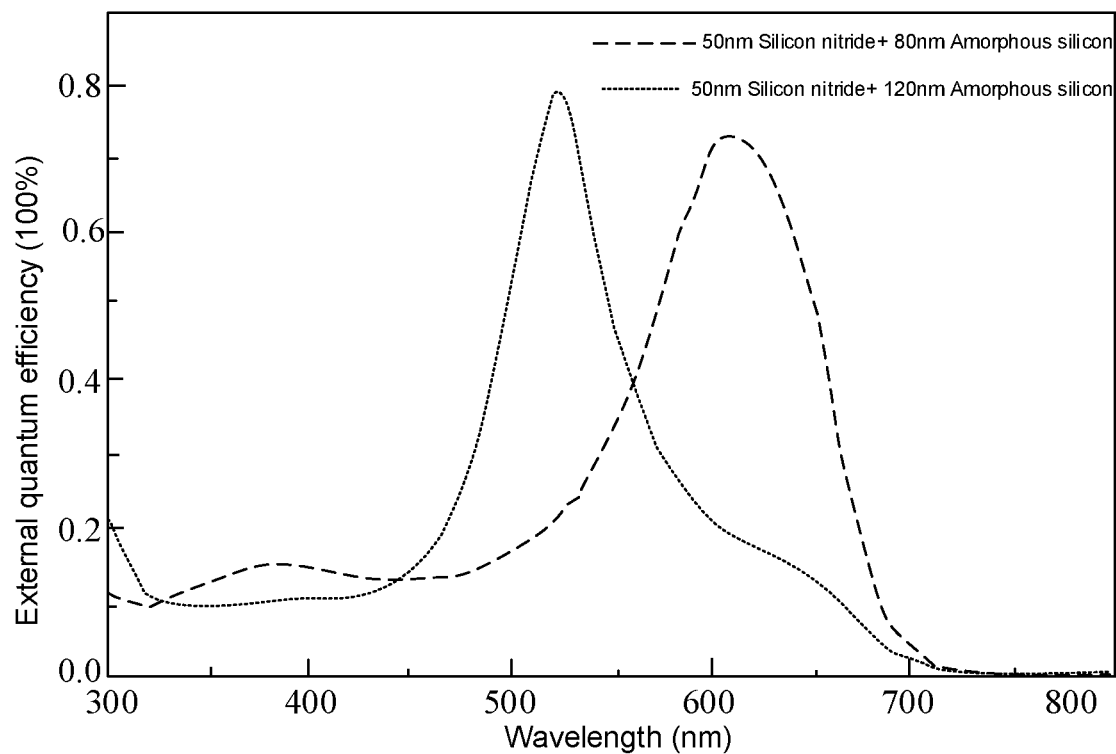
FIG. 13 is a graph showing an external quantum efficiency of a first photodetector provided with a first dimming portion and an external quantum efficiency of a second photodetector provided with a second dimming portion, in accordance with some embodiments of the present disclosure.

As shown in FIG. 13, FIG. 13 is a graph showing an external quantum efficiency of the first photodetector 3a provided with the first dimming portion 5a and an external quantum efficiency of the second photodetector 3b provided with the second dimming portion 5b. It can be seen from FIG. 13 that the first photodetector 3a provided with the first dimming portion 5a has a high external quantum efficiency for the light with the wavelength of about 620 nm, and the second photodetector 3b provided with the second dimming portion 5b has a high external quantum efficiency for the light with the wavelength of about 520 nm. This further indicates that the first dimming portion 5a has a high transmittance for the light with the wavelength of about 620 nm, and the second dimming portion 5b has a high transmittance for the light with the wavelength of about 520 nm.

The above structure of the dimming portion 5 not only enables the transmission and reflection of the radiation fluorescences with specific wavelengths to be realized, but also facilitates the manufacturing of the dimming portion 5, which is conducive to simplifying the manufacturing process of the ray detector substrate 100.

A process of manufacturing the dimming portions 5 will be schematically described below by taking the above example as an example.

For example, after the photodetectors 3 are manufactured, a silicon nitride thin film with a thickness of about 50 nm is formed on the side of the photodetectors 3 away from the substrate 1 by using a deposition process, and then the silicon nitride thin film is patterned by using a photolithography process to obtain first dimming layers 51 in the first dimming portions 5a and the second dimming portions 5b. Then, an amorphous silicon thin film with a thickness of about 120 nm is formed on a side of the first dimming layers 51 away from the substrate 1 by using a deposition process, and then the amorphous silicon thin film is patterned by using a photolithography process to obtain a plurality of patterns. Patterns located on a side of the second photodetectors 3b away from the substrate 1 are respectively second dimming layers 52 in the second dimming portions 5b. Then, patterns located on a side of the first photodetectors 3a away from the substrate 1 are etched by a reactive ion etching (RIE) process or an inductively coupled plasma (ICP) etching process, so as to obtain patterns with a thickness of about 80 nm, so that second dimming layers 52 in the first dimming portions 5a are obtained.

For another example, after the photodetectors 3 are manufactured, the silicon nitride thin film with the thickness of about 50 nm is formed on the side of the photodetectors 3 away from the substrate 1 by using a deposition process, and then the silicon nitride thin film is patterned by using the photolithography process to obtain the first dimming layers 51 in the first dimming portions 5a and the second dimming portions 5b. Then, an amorphous silicon thin film with a thickness of about 80 nm is formed on the side of the first dimming layers 51 away from the substrate 1 by using a deposition process, and then the amorphous silicon thin film is patterned by using a photolithography process to obtain a plurality of patterns. Patterns located on the side of the first photodetectors 3a away from the substrate 1 are respectively the second dimming layers 52 in the first dimming portions 5a. Then, patterns with a thickness of about 40 nm are respectively formed on patterns located on the side of the second photodetectors 3b away from the substrate 1 by using a deposition process, so that the second dimming layers 52 in the second dimming portions 5b are obtained.

Here, it will be noted that in the first dimming portion 5a, the number of the first dimming layer(s) 51 or the second dimming layer(s) 52, the thicknesses of the film layers, the selected materials and the arrangement of the first dimming layer(s) 51 and the second dimming layer(s) 52 may be the same as or different from the second dimming portion 5b, which are able to be matched with refractive indexes of corresponding materials, so that the first dimming portion 5a and the second dimming portion 5b each may selectively transmit light with a specific wavelength, and reflect light with other wavelengths, which is not limited in some embodiments of the present disclosure.

Figure 2:
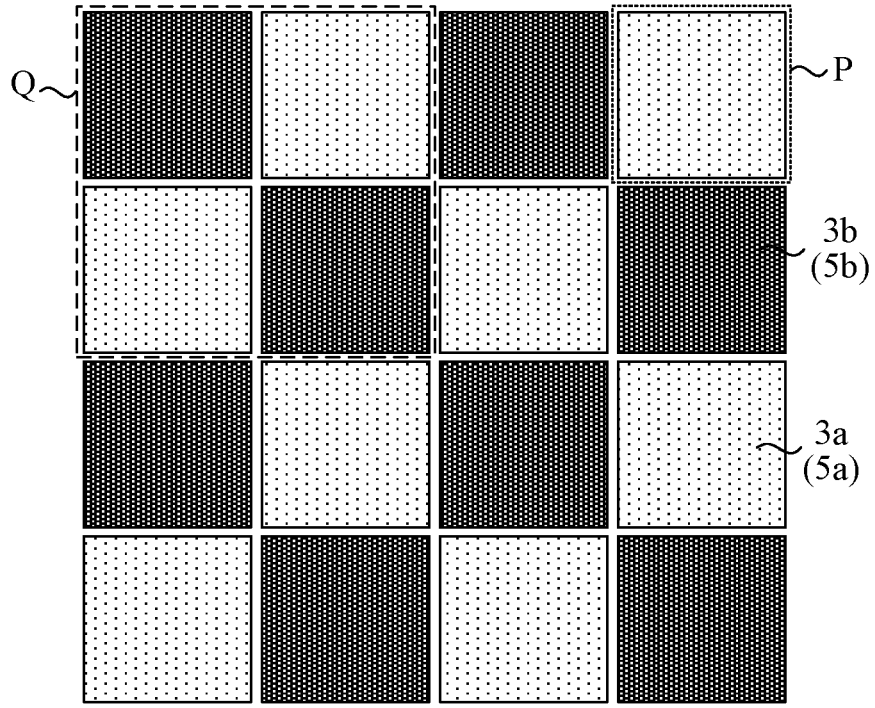
FIG. 2 is a structural diagram of another ray detector substrate, in accordance with some embodiments of the present disclosure.
Figure 3:
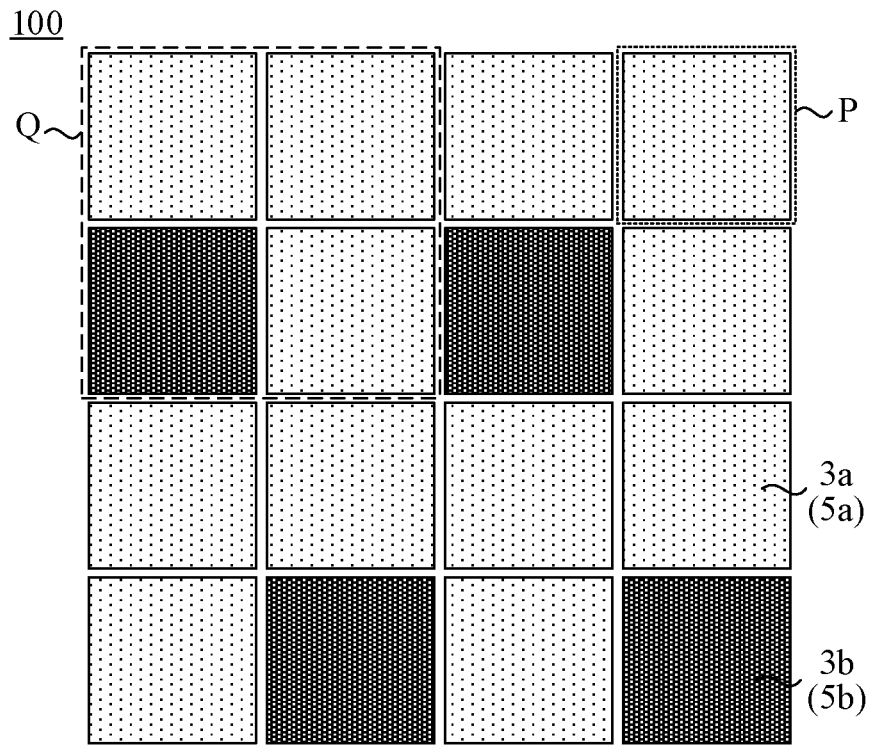
FIG. 3 is a structural diagram of yet another ray detector substrate, in accordance with some embodiments of the present disclosure.
Figure 4:
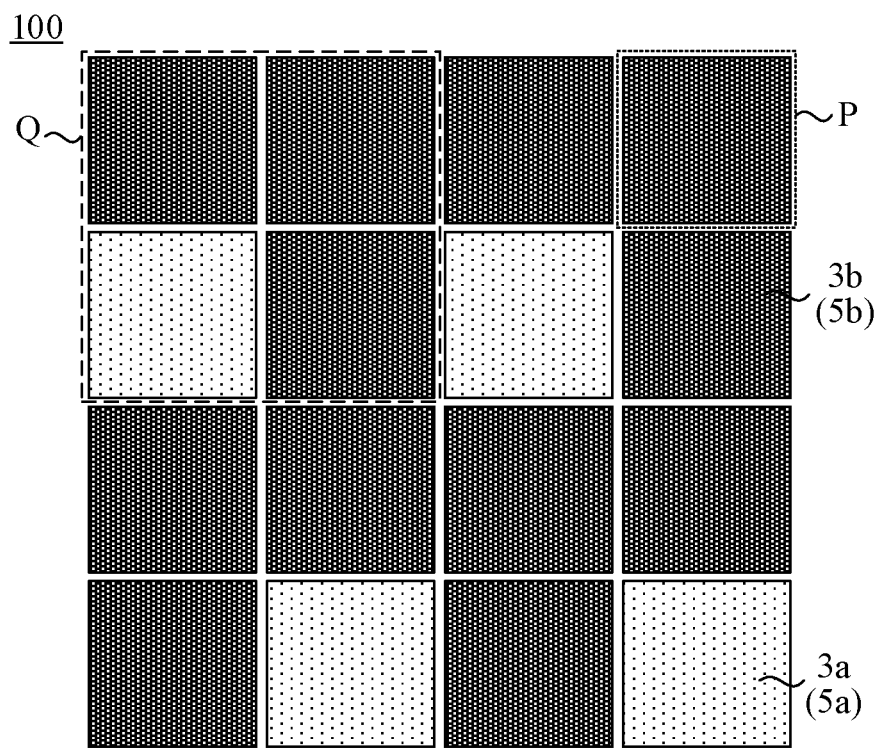
FIG. 4 is a structural diagram of yet another ray detector substrate, in accordance with some embodiments of the present disclosure.

In some embodiments, as shown in FIGS. 2 to 4, the ray detector substrate 100 has a plurality of detection regions Q. The detection regions Q are, for example, arranged in an array.

In some examples, as shown in FIGS. 2 to 4, each detection region Q is provided with at least two photodetectors 3 arranged in an array therein, and the at least two photodetectors 3 include at least one first photodetector 3a and at least one second photodetector 3b. That is, each detection region Q includes at least two regions P. In the at least two regions P, at least one region P is used to detect the first radiation fluorescence (mainly converted by the low-energy X-rays), and at least one region P is used to detect the second radiation fluorescence (converted by the high-energy X-rays).

By setting a ratio of the number of the first photodetector(s) 3a to the number of the second photodetector(s) 3b in each detector Q, different X-rays (including the low-energy X-rays and the high-energy X-rays) may be detected.

Below, as an example, each detection region Q is provided with four photodetectors 3 arranged in an array therein.

For example, as shown in FIG. 2, each detection region Q is provided with two first photodetectors 3a and two second photodetectors 3b therein, and the two first photodetectors 3a and two second photodetectors 3b are uniformly arranged in a staggered manner. That is, each detection region Q is provided with two first dimming portions 5a and two second dimming portions 5b therein, and the two first dimming portions 5a and the two second dimming portions 5b are uniformly arranged in a staggered manner.

In this case, the ray detector substrate 100 may detect the X-rays in which a percentage of the low-energy X-rays is the same as or approximately the same as a percentage of the high-energy X-rays.

For example, as shown in FIG. 3, each detection region Q is provided with three first photodetectors 3a and a second photodetector 3b therein. That is, each detection region Q is provided with three first dimming portions 5a and a second dimming portion 5b therein.

In this case, the ray detector substrate 100 may detect the X-rays in which the percentage of the low-energy X-rays is greater than the percentage of the high-energy X-rays.

For example, as shown in FIG. 4, each detection region Q is provided with a first photodetector 3a and three second photodetectors 3b therein. That is, each detection region Q is provided with a first dimming portion 5a and three second dimming portions 5b therein.

In this case, the ray detector substrate 100 may detect the X-rays in which the percentage of the low-energy X-rays is less than the percentage of the high-energy X-rays.

In some examples, in the ray detector substrate 100, in the direction parallel to the substrate 1, a dimension of each region P is equal or approximately equal. That is, a region P for detecting the first radiation fluorescence and a region P for detecting the second radiation fluorescence have equal or approximately equal dimension. In this way, each detection region Q may be a regular region, which facilitates an arrangement of the detection regions Q, and facilitates the wiring layout.

For example, in the direction parallel to the substrate 1, the dimension of each region P may be in a range of 50 μm to 200 μm, inclusive. For example, the dimension of each region P may be 50 μm, 80 μm, 110 μm, 150 μm, 170 μm, or 200 μm.

A material of the first scintillator layer 6 and a material of the second scintillator layer 7 vary, and may be set according to actual needs.

In some embodiments, the material of the first scintillator layer 6 includes a first perovskite material, and the material of the second scintillator layer 7 includes a second perovskite material.

Figure 14:
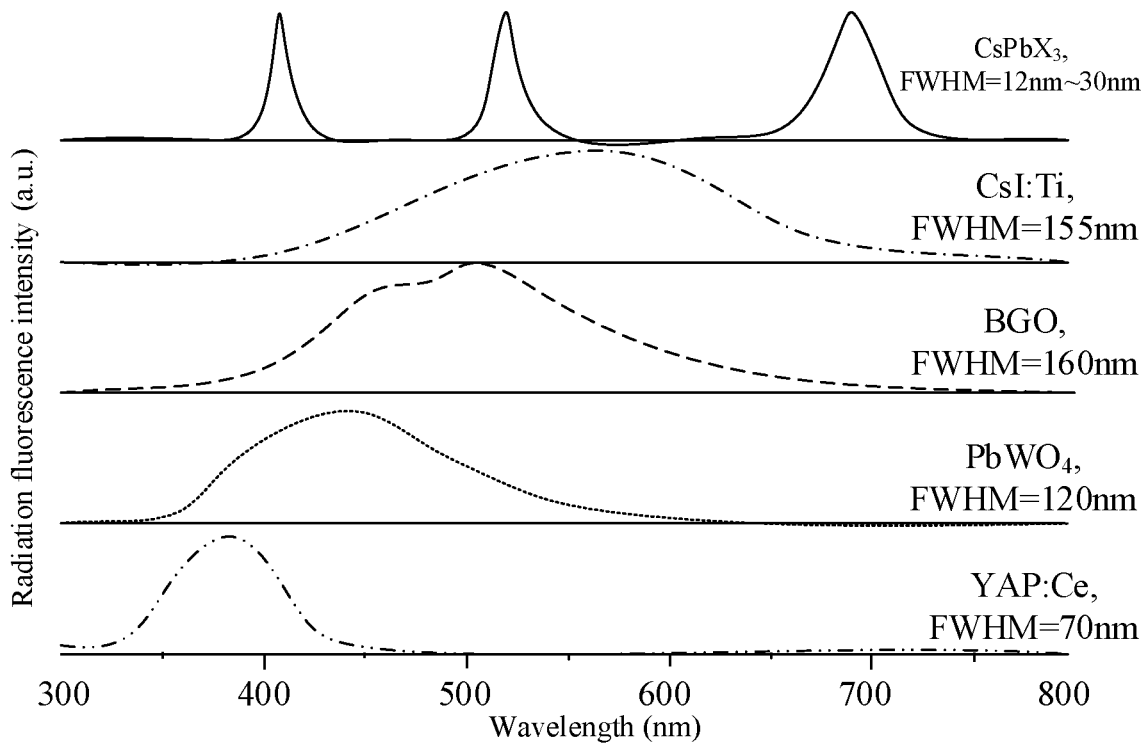
FIG. 14 is a graph showing radiation fluorescence spectra of a plurality of scintillator materials, in accordance with some embodiments of the present disclosure.

As shown in FIG. 14, a radiation fluorescence converted by a perovskite material has a narrower full width at half maximum (FWHM) than a radiation fluorescence converted by a traditional scintillator material. Moreover, a wavelength of the radiation fluorescence converted by the perovskite material is continuously adjustable in a range of 400 nm to 700 nm, inclusive. The traditional scintillator material is, for example, cesium iodide (CsI:Ti), bismuth germanate (BGO), lead tungstate (PbWO$_4$) or yttrium aluminate (YAP: Ce).

The materials of the first scintillator layer 6 and the second scintillator layer 7 are set to be different perovskite materials, so that radiation fluorescences with different wavelengths may be obtained. For example, the first radiation fluorescence with the long wavelength may be obtained by the conversion of the second scintillator layer 7, and the second radiation fluorescence with the short wavelength may be obtained by the conversion of the first scintillator layer 6, so that an interference between the first radiation fluorescence and the second radiation fluorescence is avoided, and the first radiation fluorescence and the second radiation fluorescence are distinguished conveniently, and thus, the ray detector substrate 100 has a good capability of detecting and distinguishing the dual-energy X-rays.

In some examples, the first perovskite material includes a first perovskite nanocrystalline material, and a particle size of the first perovskite nanocrystalline material may be in a range of 4 nm to 200 nm, inclusive. The second perovskite material includes a second perovskite nanocrystalline material, and a particle size of the second perovskite nanocrystalline material may be in a range of 4 nm to 200 nm, inclusive.

For example, the particle size of the first perovskite nanocrystalline material may be 4 nm, 50 nm, 90 nm, 130 nm, 160 nm, or 200 nm. The particle size of the second perovskite nanocrystalline material may be 4 nm, 60 nm, 90 nm, 140 nm, 170 nm, or 200 nm.

The first perovskite nanocrystalline material is present in a variety of forms. For example, the first perovskite nanocrystalline material may be present in a form of a single crystal, a polycrystal, a nanowire, a nanosheet, a nanorod, or a nanofilm. The second perovskite nanocrystalline material is present in a variety of forms. For example, the second perovskite nanocrystalline material may be present in a form of a single crystal, a polycrystal, a nanowire, a nanosheet, a nanorod, or a nanofilm.

The first perovskite material or the second perovskite material may be, for example, AMX$_3$ material or AM$_2$X$_4$ material.

Below, a schematic description will be made in an example where the first perovskite material and the second perovskite material are AMX$_3$ materials.

Figure 15:
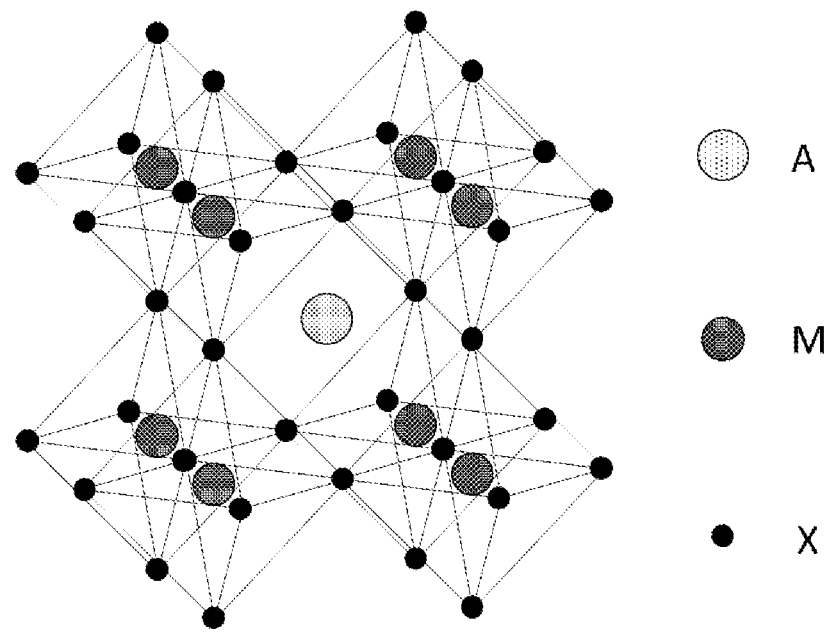
FIG. 15 is a lattice structure diagram of a perovskite material, in accordance with some embodiments of the present disclosure.

In some examples, a lattice structure of the first perovskite material or the second perovskite material of AMX$_3$ may be as shown in FIG. 15. A represents a monovalent cation, and may include, for example, at least one of methylamine ion (MA$^+$), formamidine ion (FA$^+$) and cesium ion (Cs$^+$). M represents a divalent cation, and may include, for example, at least one of lead ion (Pb$^{2+}$) and tin ion (Sn$^{2+}$). X represents a halide ion, and may include, for example, at least one of chloride ion (Cl$^-$), bromide ion (Br$^-$) and iodide ion (I$^-$).

For example, A is Cs$^+$, M is Pb$^{2+}$, and the first perovskite material or the second perovskite material may be represented by a chemical formula CsPbX$_3$.

In some examples, halide ions in the first perovskite material are different from halide ions in the second perovskite material, so that a spectrum of the first radiation fluorescence is non-overlapped with a spectrum of the second radiation fluorescence.

In this way, a wavelength range of the first radiation fluorescence may be ensured to be non-overlapped with a wavelength range of the second radiation fluorescence, so that the first radiation fluorescence and the second radiation fluorescence has a clear distinction therebetween. In the process of detecting the dual-energy X-rays, the first dimming portion 5a, the second dimming portion 5b, the first perovskite material and the second perovskite material may cooperate. That is, the first dimming portion 5a and the second dimming portion 5b may each accurately transmit a radiation fluorescence with a corresponding wavelength and reflect a radiation fluorescence with other wavelength, so that the detection and distinguishing capability of the ray detector substrate 100 on the dual-energy X-rays is improved, and the accuracy of the detection results is improved.

For example, the halide ions in the first perovskite material may be Cl$^-$. That is, the first perovskite material may be CsPbCl$_3$. The halide ions in the second perovskite material may be I$^-$. That is, the second perovskite material may be CsPbI$_3$.

In some examples, an absorption coefficient of the first scintillator layer 6 for the first radiation fluorescence may be in a range of 0 cm$^{-1}$ to 200 cm$^{-1}$, inclusive.

That is, the first scintillator layer 6 cannot absorb the first radiation fluorescence, or may only absorb a small amount of the first radiation fluorescence. In this way, the absorption of the first radiation fluorescence by the first scintillator layer 6 may be reduced or avoided, so that an influence on the propagation of the first radiation fluorescence is reduced, so as to ensure that the first radiation fluorescence is able to be well detected by the photodetectors 3, thereby ensuring the detection capability of the ray detector substrate 100 on the low-energy X-rays.

In some examples, a forbidden bandwidth of the first scintillator layer 6 is greater than a forbidden bandwidth of the second scintillator layer 7.

Figure 16:
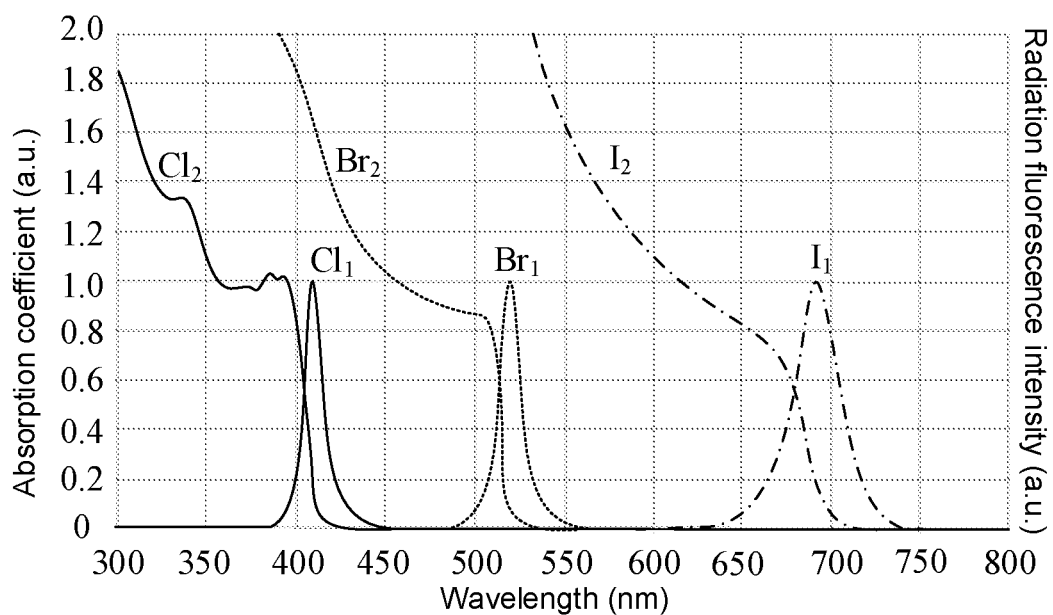
FIG. 16 shows radiation fluorescence spectra and absorption spectra of perovskite materials, in accordance with some embodiments of the present disclosure.

As shown in FIG. 16, FIG. 16 shows absorption spectra and radiation fluorescence spectra of three perovskite materials with different halide ions. The reference Cl$_1$ represents a radiation fluorescence spectrum of CsPbCl$_3$, and the reference Cl$_2$ represents an absorption spectrum of CsPbCl$_3$; the reference Br$_1$ represents a radiation fluorescence spectrum of CsPbBr$_3$, and the reference Br$_2$ represents an absorption spectrum of CsPbBr$_3$; the reference I$_1$ represents a radiation fluorescence spectrum of CsPbI$_3$, and the reference I$_2$ represents an absorption spectrum of CsPbI$_3$.

It can be seen from FIG. 16 that the perovskite materials including different halide ions have radiation fluorescence spectra and absorption spectra with different wavelengths. The perovskite material including only Cl$^-$ has a maximum forbidden bandwidth and a radiation fluorescence with a shortest wavelength. The perovskite material including only I$^-$ has a minimum forbidden bandwidth and a radiation fluorescence with a longest wavelength. A forbidden bandwidth of the perovskite material including only Br$^-$ is less than the forbidden bandwidth of the perovskite material including only Cl$^-$. A forbidden bandwidth of a perovskite material including both Cl$^-$ and Br$^-$ is between the forbidden bandwidth of the perovskite material including only Cl$^-$ and the forbidden bandwidth of the perovskite material including only Br$^-$. Moreover, a radiation fluorescence of a perovskite material with a large forbidden bandwidth is able to be absorbed by a perovskite material with a small forbidden bandwidth, and conversely, the perovskite material with the large forbidden bandwidth cannot absorb a radiation fluorescence of the perovskite material with the small forbidden bandwidth.

The forbidden bandwidth of the first scintillator layer 6 is set to be greater than the forbidden bandwidth of the second scintillator layer 7, so that the first radiation fluorescence converted by the second scintillator layer 7 may be ensured to be unabsorbed by the first scintillator layer 6. That is, the first scintillator layer 6 is ensured to have a high transmittance for the first radiation fluorescence. In this way, the influence of the first scintillator layer 6 on the propagation of the first radiation fluorescence may be effectively reduced, so as to ensure that the first radiation fluorescence is able to be well detected by the photodetectors 3, thereby ensuring the detection capability and the detection effect of the ray detector substrate 100 on the low-energy X-rays.

For example, the first scintillator layer 6 may be made of $CsPbCl_3$ or $CsPbCl_mBr_{3-m}$. The second scintillator layer 7 may be made of $CsPbI_3$ or $CsPbBr_nI_{3-n}$. Here, m is any value between 0 and 3, and n is any value between 0 and 3.

For example, the first scintillator layer 6 may be made of $CsPbCl_3$, and the second scintillator layer 7 may be made of $CsPbBr_3$. The first scintillator layer 6 may be made of $CsPbBr_3$, and the second scintillator layer 7 may be made of $CsPbI_3$.

The thickness of the first scintillator layer 6 and the thickness of the second scintillator layer 7 may be set according to actual needs.

In some examples, the thickness of the first scintillator layer 6 may be in a range of 1 µm to 2000 µm, inclusive. The thickness of the second scintillator layer 7 may be in a range of 1 µm to 2000 µm, inclusive.

For example, the thickness of the first scintillator layer 6 may be 1 µm, 100 µm, 500 µm, 900 µm, 1300 µm, 1800 µm or 2000 µm. The thickness of the second scintillator layer 7 may be 1 µm, 10 µm, 100 µm, 800 µm, 1500 µm, 1700 µm or 2000 µm.

It will be noted that in the related art, a scintillator material in the low-energy X-ray detector generally has a small thickness, so as to reduce an influence of the low-energy X-ray detector on the propagation of the high-energy X-rays. However, it is difficult to manufacture this scintillator material with the small thickness.

However, in the ray detector substrate 100, the high-energy X-rays may be incident on the first scintillator layer 6 only by passing through the second scintillator layer 7, and do not need to pass through the entire low-energy X-ray detector. In this way, it is not necessary to set the thickness of the second scintillator layer 7 to be small, so that the difficulty of manufacturing the second scintillator layer 7 is reduced, and the difficulty of manufacturing the ray detector substrate 100 is reduced.

In addition, the thickness of the second scintillator layer 7 is set to be in the above range, so that the low-energy X-rays may be relatively complete absorbed and converted, and the influence on the propagation of the high-energy X-rays may be reduced. The thickness of the first scintillator layer 6 is set to be in the above range, so that the absorption and conversion effects of the first scintillator layer 6 on the high-energy X-rays may be ensured, and the influence on the propagation of the first radiation fluorescence may be avoided, so as to improve the distinguishing capability of the ray detector substrate 100 on the first radiation fluorescence.

In some embodiments, as shown in FIGS. 7 to 10, the ray detector substrate 100 further includes a filter layer 9 disposed between the first scintillator layer 6 and the second scintillator layer 7. The filter layer 9 is configured to block part of the first energy rays (i.e., low-energy X-rays) unconverted by the second scintillator layer 7.

In the process of detecting the X-rays, the low-energy X-rays in the X-rays may be completely absorbed and converted by the second scintillator layer 7, or only part of the low-energy X-rays may be absorbed. In a case where the low-energy X-rays are not completely absorbed and converted, the filter layer 9 is disposed to block and filter the part of the low-energy X-rays unabsorbed and unconverted by the second scintillator layer 7, so as to avoid travelling to the first scintillator layer 6, so that X-rays absorbed and converted by the first scintillator layer 6 are approximately all high-energy X-rays, which is conducive to improving an accuracy of distinguishing the first radiation fluorescence and the second radiation fluorescence, thereby being conducive to improving the distinguishing capability of the ray detector substrate 100 on the first radiation fluorescence and the second radiation fluorescence and the accuracy of the detection results.

A structure of the filter layer 9 varies, and may be set according to actual needs.

For example, the filter layer 9 may be a fiber optic plate, a light-transmitting aluminum plate, a glass plate doped with heavy metal (e.g., Pb) or an organic plastic plate.

In some examples, the thickness of the filter layer 9 may be in a range of 5 µm to 1000 µm, inclusive. In this way, the filter layer 9 may be ensured to have good blocking and filtering effects on the low-energy X-rays, and the filter layer 9 may have a high transmittance for the first radiation fluorescence.

For example, the thickness of the filter layer 9 may be 5 µm, 50 µm, 130 µm, 400 µm, 650 µm, 810 µm, or 1000 µm.

In some embodiments, as shown in FIGS. 8 to 10, the ray detector substrate 100 further includes a reflective layer 10 disposed on a side of the second scintillator layer 7 away from the substrate 1. The reflective layer 10 is configured to enable rays (e.g., the X-rays) to pass through the reflective layer 10 toward the second scintillator layer 7, and to reflect radiation fluorescence(s) (e.g., including the first radiation fluorescence and/or second radiation fluorescence) incident on the reflective layer 10.

In some examples, a propagation direction of the first radiation fluorescence converted by the second scintillator layer 7 may be arbitrary, and a propagation direction of the second radiation fluorescence converted by the first scintillator layer 6 may be arbitrary. The reflective layer 10 is disposed on the side of the second scintillator layer 7 away from the substrate 1, so that when propagating toward the reflective layer 10, the first radiation fluorescence and/or the second radiation fluorescence may be reflected toward the dimming portions 5, so as to increase a proportion of the first radiation fluorescence and/or the second radiation fluorescence detected by the photodetectors 3, thereby improving a detective quantum efficiency (DQE) and a sensitivity of the ray detector substrate 100.

A material of the reflective layer 10 varies, and may be set according to actual needs.

For example, the material of the reflective layer 10 may include at least one of a metallic material and a non-metallic material. For example, the material of the reflective layer 10 includes aluminum (Al) or polyethylene terephthalate (PET).

Figure 17:
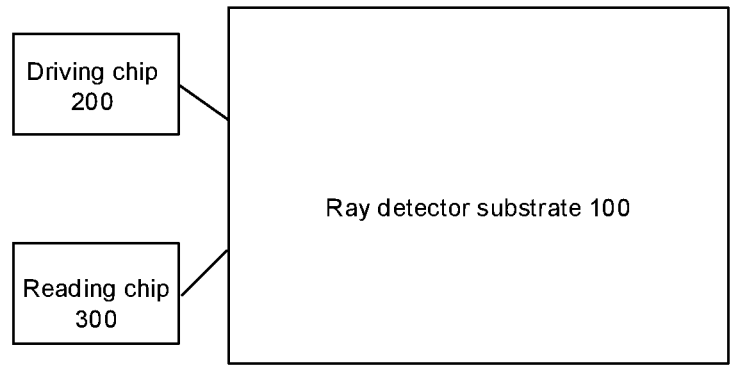
FIG. 17 is a structural diagram of a ray detector, in accordance with some embodiments of the present disclosure.

Some embodiments of the present disclosure provide a ray detector 1000. As shown in FIG. 17, the ray detector 1000 includes the ray detector substrate 100 in any one of the above embodiments, a driving chip 200 electrically connected to the ray detector substrate 100, and a reading chip 300 electrically connected to the ray detector substrate 100.

Figure 18:
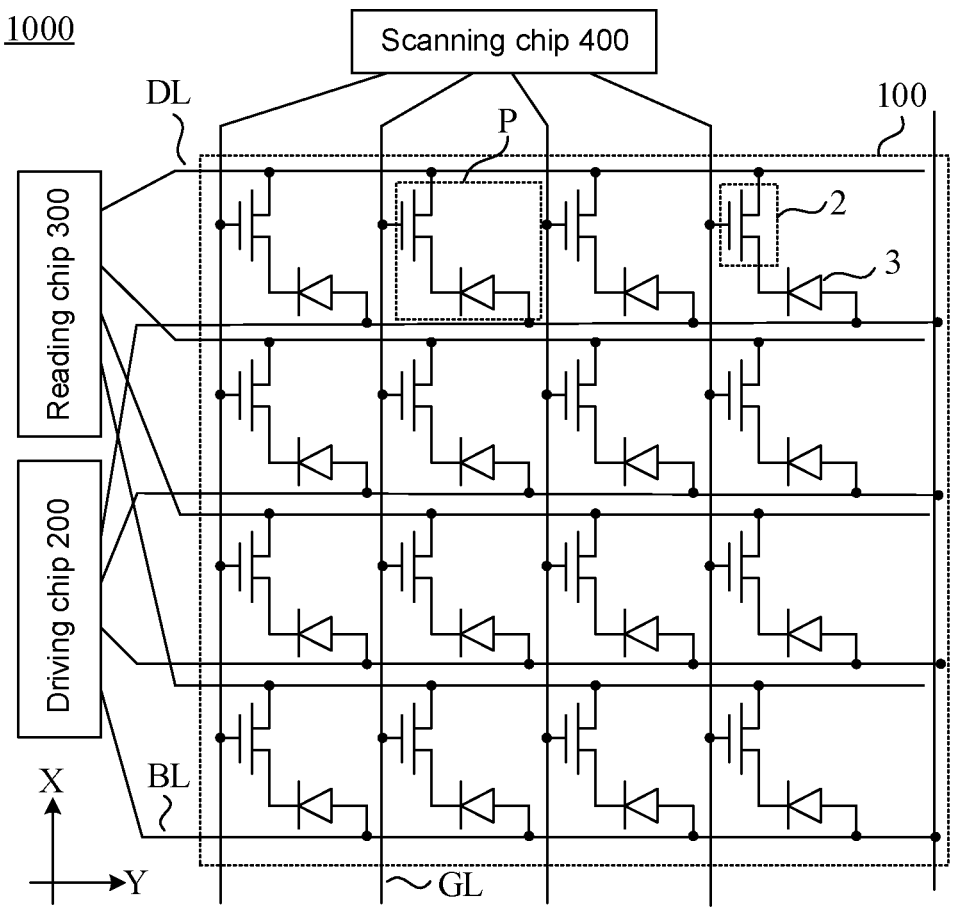
FIG. 18 is a structural diagram of another ray detector, in accordance with some embodiments of the present disclosure.

In some examples, as shown in FIG. 18, the driving chip 200 may be electrically connected to the plurality of bias voltage signal lines BL in the ray detector substrate 100. The driving chip 200 is configured to supply driving voltages to the plurality of photodetectors 3 in the ray detector substrate 100. For example, the driving chip 200 may supply bias voltages to the plurality of photodetectors 3 through the plurality of bias voltage signal lines BL.

In some examples, as shown in FIG. 18, the reading chip 300 may be electrically connected to the plurality of data lines DL in the ray detector substrate 100. The reading chip 300 is configured to read detection results of the plurality of photodetectors 3.

In some examples, as shown in FIG. 18, the ray detector 1000 further includes a scanning chip 400 that may be electrically connected to the plurality of gate lines GL in the ray detector substrate 100. The scanning chip 400 is configured to supply scan signals to the plurality of gate lines GL in the ray detector substrate 100, so as to control operating states of the transistors 2.

In some examples, FIG. 18 is an equivalent circuit diagram of the ray detector 1000. The operating principle of the ray detector 1000 will be schematically described below by taking the equivalent circuit diagram shown in FIG. 18 as an example.

First, the driving chip 200 supplies the driving voltages (i.e., bias voltages) to the plurality of bias voltage signal lines BL, and transmits the driving voltages to the photodetectors 3.

Then, the X-rays are incident on the second scintillator layer 7.

After the X-rays are incident on the second scintillator layer 7, at least part of the low-energy X-rays and a small part of the high-energy X-rays in the X-rays may be converted into the first radiation fluorescence by the second scintillator layer 7. After the low-energy X-rays are approximately completely converted, the remaining high-energy X-rays continue to propagate toward the first scintillator layer 6. The first radiation fluorescence propagates toward the first scintillator layer 6 synchronously. The remaining high-energy X-rays are converted by the first scintillator layer 6 into the second radiation fluorescence.

The first radiation fluorescence and the second radiation fluorescence are incident on the dimming portions 5. In the radiation fluorescences incident on the first dimming portions 5a, the second radiation fluorescence is reflected, and the first radiation fluorescence is transmitted and photoelectrically converted by the first photodetectors 3a. In the radiation fluorescences incident on the second dimming portions 5b, the first radiation fluorescence is reflected, and the second radiation fluorescence is transmitted and photoelectrically converted by the second photodetectors 3b.

Then, the scanning chip 400 transmits the scan signals to the plurality of gate lines GL to control the transistors 2 to be turned on.

After the transistors 2 are turned on, a photocurrent converted by the first photodetector 3a and a photocurrent converted by the second photodetector 3b may be derived through respective data lines DL, and may be read by the reading chip 300.

Through the above operating process, the ray detector 1000 detects the X-rays.

It will be noted that considering the arrangement of the first dimming portions 5a and the second dimming portions 5b in the ray detector substrate 100, different transistors 2 may be turned on in different time intervals, and photocurrents converted by different photodetectors 3 may be read in different time intervals, so as to improve a detection accuracy of the ray detector 1000 on the X-rays.

Beneficial effects that can be achieved by the ray detector 1000 provided in some embodiments of the present disclosure are the same as the beneficial effects that can be achieved by the ray detector substrate 100 provided in some of the above embodiments, and will not be repeated here.

The foregoing descriptions are only specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A ray detector substrate, comprising:
   a substrate;
   a plurality of photodetectors located on a side of the substrate and including a plurality of first photodetectors and a plurality of second photodetectors;
   a plurality of dimming portions respectively located on sides of the plurality of photodetectors away from the substrate; wherein the plurality of dimming portions include, at a side of each first photodetector away from the substrate, a respective first dimming portion, and, at a side of each second photodetector away from the substrate, a respective second dimming portion;
   a first scintillator layer located on a side of the plurality of dimming portions away from the substrate; and
   a second scintillator layer located on a side of the first scintillator layer away from the substrate;
   wherein the second scintillator layer is configured to convert part of rays incident on the second scintillator layer into a first radiation fluorescence, and to enable another part of the rays to pass through the second scintillator layer toward the first scintillator layer;
   the first scintillator layer is configured to convert the another part of the rays passing through the second scintillator layer into a second radiation fluorescence, and to enable the first radiation fluorescence and the second radiation fluorescence to travel to the plurality of dimming portions; an average energy of the part of the rays is less than an average energy of the another part of the rays, and a wavelength of the first radiation fluorescence is greater than a wavelength of the second radiation fluorescence;
   the first dimming portion is configured to reflect the second radiation fluorescence, and to enable the first radiation fluorescence to pass through the first dimming portion to be detected by the first photodetector;
   the second dimming portion is configured to reflect the first radiation fluorescence, and to enable the second radiation fluorescence to pass through the second dimming portion to be detected by the second photodetector; and
   an orthographic projection of an end of each photodetector proximate to a respective dimming portion on the substrate is located within an orthographic projection of the respective dimming portion on the substrate;
   wherein each dimming portion includes a first dimming layer and a second dimming layer, wherein
   the first dimming layer is closer to the substrate than the second dimming layer; and
   a refractive index of the first dimming layer is less than a refractive index of the second dimming layer;

wherein a thickness of a first dimming layer in the first dimming portion is equal to or approximately equal to a thickness of a first dimming layer in the second dimming portion; and a thickness of a second dimming layer in the first dimming portion is less than a thickness of a second dimming layer in the second dimming portion.

2. The ray detector substrate according to claim 1, wherein the ray detector substrate has a plurality of detection regions; wherein each detection region is provided with at least two photodetectors arranged in an array therein; and the at least two photodetectors include at least one first photodetector and at least one second photodetector.

3. The ray detector substrate according to claim 2, wherein the at least one first photodetector includes two first photodetectors, and the at least one second photodetector includes two second photodetectors.

4. The ray detector substrate according to claim 2, wherein the at least one first photodetector includes three first photodetectors, and the at least one second photodetector includes a second photodetector.

5. The ray detector substrate according to claim 2, wherein the at least one first photodetector includes a first photodetector, and the at least one second photodetector includes three second photodetectors.

6. The ray detector substrate according to claim 1, wherein a material of the first scintillator layer includes a first perovskite material, and a material of the second scintillator layer includes a second perovskite material.

7. The ray detector substrate according to claim 6, wherein halide ions in the first perovskite material are different from halide ions in the second perovskite material, so that a spectrum of the first radiation fluorescence is non-overlapped with a spectrum of the second radiation fluorescence.

8. The ray detector substrate according to claim 6, wherein halide ions in the first perovskite material include at least one of chloride ions, bromide ions and iodide ions; and halide ions in the second perovskite material include at least one of chloride ions, bromide ions and iodide ions.

9. The ray detector substrate according to claim 1, wherein a forbidden bandwidth of the first scintillator layer is greater than a forbidden bandwidth of the second scintillator layer.

10. The ray detector substrate according to claim 1, wherein the rays incident on the second scintillator layer include first energy rays and second energy rays, and an energy of the first energy rays is lower than an energy of the second energy rays;

the part of the rays converted by the second scintillator layer include at least part of the first energy rays and part of the second energy rays; and the ray detector substrate further comprises a filter layer located between the first scintillator layer and the second scintillator layer; wherein the filter layer is configured to block part of the first energy rays unconverted by the second scintillator layer.

11. The ray detector substrate according to claim 10, wherein a thickness of the filter layer is in a range of 5 μm to 1000 μm, inclusive.

12. The ray detector substrate according to claim 1, further comprising a reflective layer located on a side of the second scintillator layer away from the substrate; wherein the reflective layer is configured to enable the rays to pass through the reflective layer toward the second scintillator layer, and to reflect the first radiation fluorescence and/or the second radiation fluorescence incident on the reflective layer.

13. The ray detector substrate according to claim 1, further comprising a light-transmitting plate located on a side of the first scintillator layer proximate to the substrate; wherein the light-transmitting plate is configured to carry the first scintillator layer and the second scintillator layer, and to enable the first radiation fluorescence and the second radiation fluorescence to pass through the light-transmitting plate toward the plurality of dimming portions.

14. The ray detector substrate according to claim 13, wherein a thickness of the light-transmitting plate is in a range of 50 μm to 10000 μm, inclusive.

15. A ray detector, comprising:

the ray detector substrate according to claim 1;

a driving chip electrically connected to the ray detector substrate and configured to supply driving voltages to the plurality of photodetectors; and a reading chip electrically connected to the ray detector substrate and configured to read detection results of the plurality of photodetectors.

16. The ray detector substrate according to claim 1, wherein a thickness of the first scintillator layer is in a range of 1 μm to 2000 μm, inclusive.

17. The ray detector substrate according to claim 1, wherein a thickness of the second scintillator layer is in a range of 1 μm to 2000 μm, inclusive.

* * * * *